(12) United States Patent
Wu et al.

(10) Patent No.: US 10,904,701 B2
(45) Date of Patent: Jan. 26, 2021

(54) POSITIONING INFORMATION TRANSMISSION METHOD AND COMMUNICATION DEVICE

(71) Applicant: HYTERA COMMUNICATIONS CORP., LTD., Guangdong (CN)

(72) Inventors: Guowen Wu, Shenzhen (CN); Yingzhe Zhang, Shenzhen (CN); Samuel Chia Han Siong, Shenzhen (CN)

(73) Assignee: Hytera Communications Corporation Limited, Guangdong (CN)

( * ) Notice: Subject to any disclaimer, the term of this patent is extended or adjusted under 35 U.S.C. 154(b) by 301 days.

(21) Appl. No.: 15/745,210

(22) PCT Filed: Jul. 14, 2016

(86) PCT No.: PCT/CN2016/090019
§ 371 (c)(1),
(2) Date: Dec. 10, 2018

(87) PCT Pub. No.: WO2017/008751
PCT Pub. Date: Jan. 19, 2017

(65) Prior Publication Data
US 2019/0116573 A1    Apr. 18, 2019

(30) Foreign Application Priority Data

Jul. 14, 2015   (CN) .......................... 2015 1 0413603

(51) Int. Cl.
*H04W 4/029*    (2018.01)
*H04W 64/00*    (2009.01)
*H04W 28/06*    (2009.01)

(52) U.S. Cl.
CPC .......... *H04W 4/029* (2018.02); *H04W 64/00* (2013.01); *H04W 28/06* (2013.01)

(58) Field of Classification Search
CPC ...... H04W 4/029; H04W 64/00; H04W 28/06
(Continued)

(56) References Cited

U.S. PATENT DOCUMENTS

| 2004/0203856 A1* | 10/2004 | Wigren | ................. G01S 5/0236 455/456.1 |
| 2006/0161346 A1* | 7/2006 | Murakami | ........... G09B 29/102 708/442 |

(Continued)

FOREIGN PATENT DOCUMENTS

| CN | 103874017 A | 6/2014 |
| CN | 103930792 A | 7/2014 |

(Continued)

OTHER PUBLICATIONS

English Translation of International Search Report from PCT/CN2016/090019 dated Sep. 27, 2016 (2 pages).

*Primary Examiner* — Mong-Thuy T Tran
(74) *Attorney, Agent, or Firm* — Calfee, Halter & Griswold LLP

(57) ABSTRACT

The present invention provides a positioning information transmission method and communication device. In an embodiment of the present invention, a transmitting end transforms original positioning information into original integer positioning information; then compresses the original integer positioning information into compressed positioning information according to an application precision unit and an original unit of least precision; and afterwards, intercepts lower N bits as simplified positioning information from the number of bits corresponding to the compressed positioning information, wherein the simplified positioning information is a bit distinguishing from positioning information of a receiving end, so that the transmitting end only transmits the simplified positioning information that could be restored to the receiving end. Therefore, the storage space (Continued)

of wireless communication data occupied by the compressed positioning information transmitted by the transmitting end can be reduced while ensuring the receiving end can obtain the valid positioning information of the transmitting end.

20 Claims, 4 Drawing Sheets

(58) Field of Classification Search
USPC .................................................. 455/456.1
See application file for complete search history.

(56) References Cited

U.S. PATENT DOCUMENTS

| | | | |
|---|---|---|---|
| 2009/0031006 A1* | 1/2009 | Johnson .............. | G06F 16/9537 709/218 |
| 2010/0085253 A1 | 4/2010 | Ferguson et al. | |
| 2012/0329507 A1* | 12/2012 | Watanabe ............. | H04W 24/10 455/517 |
| 2015/0080019 A1* | 3/2015 | Edge .................... | H04W 4/024 455/456.1 |
| 2015/0293232 A1* | 10/2015 | Crawford ............... | G01S 19/39 342/357.43 |
| 2016/0073225 A1* | 3/2016 | Ganesalingam ........ | G06F 16/29 455/456.1 |

FOREIGN PATENT DOCUMENTS

| | | |
|---|---|---|
| CN | 104581635 A | 4/2015 |
| CN | 105101296 A | 11/2015 |

\* cited by examiner

POSITIONING INFORMATION TRANSMISSION METHOD AND COMMUNICATION DEVICE

This application claims the priority to Chinese Patent Application No. 201510413603.9 filed in State Intellectual Property Office of the PRC on Jul. 14, 2015, and titled "Positioning Information Transmission Method and Communication Device", the entire contents of which are incorporated herein by reference.

TECHNICAL FIELD

The present invention relates to the field of communications technologies, and in particular, to a positioning information transmission method and communication device.

BACKGROUND

In a digital trunking communication (Digital Mobile Radio, DMR) standard at current, global positioning information is defined by the standard format of the National Marine Electronics Association (NEMA, National Marine Electronics Association), and data is transmitted through a UDT transmission mechanism.

In the prior art, the global positioning information in the DMR standard needs to be transmitted in two timeslot frames, including one data head using a UDT-based data transfer protocol (UDT, UDP-based Data Transfer Protocol) and one UDT data block.

Air interface communication resources have become the bottleneck of the capacity of a wireless communication system due to scarce wireless spectrum and expensive communication devices. In the prior art, a transmitting end will encapsulate the positioning information thereof and other valid information in two DMR frames respectively and transmit the information to a receiving end, so that the transmission efficiency is low.

SUMMARY

The present invention provides a positioning information transmission method and communication device, which is capable of reducing the storage space of wireless communication data occupied by compressed positioning information transmitted by the transmitting end, thus improving the transmission efficiency of a wireless communication system.

In a first aspect, an embodiment of the present invention provides a positioning information transmission method, comprising:

transforming, by a transmitting end, original positioning information into original integer positioning information, wherein the original integer positioning information is an integer value of the original positioning information; compressing, by the transmitting end, the original integer positioning information into compressed positioning information according to an application precision unit and an original unit of least precision, wherein the number of binary bits corresponding to the compressed positioning information is less than the number of binary bits corresponding to the original integer positioning information; intercepting, by the transmitting end, lower N bits as simplified positioning information from binary values corresponding to the compressed positioning information, wherein N is equal to $\log_2 R$, and R is a ratio of a maximum wireless communication distance between the transmitting end and the receiving end to the application precision unit; and transmitting, by the transmitting end, the simplified positioning information to the receiving end.

In a second aspect, an embodiment of the present invention provides a positioning information transmission method, comprising:

receiving, by a receiving end, simplified positioning information transmitted by a transmitting end; transforming, by the receiving end, first original positioning information thereof into first original integer positioning information, wherein the first original integer positioning information is an integer value of the first original positioning information; compressing, by the receiving end, the first original integer positioning information into first compressed positioning information according to an application precision unit and an original unit of least precision, wherein the number of binary bits corresponding to the first compressed positioning information is less than the number of binary bits corresponding to the first original integer positioning information; restoring, by the receiving end, the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit; restoring, by the receiving end, the second compressed positioning information into second original integer positioning information according to the application precision unit and the original unit of least precision; and restoring, by the receiving end, the second original integer positioning information into second original positioning information.

In a third aspect, an embodiment of the present invention provides a communication device, comprising:

a processing unit, configured to transform original positioning information into original integer positioning information, wherein the original integer positioning information is an integer value of the original positioning information; compress the original integer positioning information into compressed positioning information according to an application precision unit and an original unit of least precision, wherein the number of binary bits corresponding to the compressed positioning information is less than the number of binary bits corresponding to the original integer positioning information; and then intercept lower N bits as simplified positioning information from binary values corresponding to the compressed positioning information, wherein N is equal to $\log_2 R$, and R is a ratio of a maximum wireless communication distance between the transmitting end and the receiving end to the application precision unit; and a transmitting unit, configured to transmit the simplified positioning information to the receiving end.

In a fourth aspect, an embodiment of the present invention provides a communication device, comprising:

a receiving unit, configured to receive simplified positioning information transmitted by a transmitting end; a processing unit, configured to transform first original positioning information thereof into first original integer positioning information, wherein the first original integer positioning information is an integer value of the first original positioning information; compress the first original integer positioning information into first compressed positioning information according to an application precision unit and an original unit of least precision, wherein the number of binary bits corresponding to the first compressed positioning information is less than the number of binary bits corresponding to the first original integer positioning information; restoring the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit; afterwards, restore the second compressed positioning information into second original integer positioning information according to the application precision unit and the original unit of least precision; and restore the second original integer positioning information into second original positioning information.

It can be seen from the above technical solutions that the solutions of the embodiments of the present invention have the following beneficial effects.

In the embodiments of the present invention, the transmitting end transforms the original positioning information into the original integer positioning information instead of transmitting the original positioning information directly; then compresses the original integer positioning information into the compressed positioning information according to the application precision unit and the original unit of least precision; afterwards, intercepts the lower N bits as the simplified positioning information from the binary values corresponding to the compressed positioning information, wherein the simplified positioning information is a bit distinguishing from the positioning information of the receiving end, the upper bit of the binary number corresponding to the compressed positioning information of the receiving end is the same as the upper bit of the binary number corresponding to the compressed positioning information of the transmitting end; therefore, the receiving end can restore the original positioning information of the transmitting end as long as the simplified positioning information is transmitted to the receiving end. Therefore, the storage space of wireless communication data occupied by the compressed positioning information transmitted by the transmitting end can be reduced under the precise of ensuring that the receiving end can obtain the valid positioning information of the transmitting end, which implements to transmit other valid information of more terminals in the same wireless communication data capacity, thus improving the transmission efficiency of the wireless communication system.

DETAILED DESCRIPTION

The technical solutions in the embodiment of the invention will be clearly and completely described below with reference to the accompanying drawings in the embodiments of the invention. Apparently, the described embodiments are merely some but not all embodiments of the invention, and all other embodiments obtained by those skilled in the art based on the embodiments of the invention without making any creative efforts shall fall within the protection scope of the invention.

The terms "first", "second" and the like in the description and claims of the invention as well as the above drawings are used to distinguish similar objects, and are not necessarily used to describe a specific sequence or a chronological order. It is to be understood that the data used in such way may be interchanged under appropriate conditions so that the embodiments described herein can be implemented in an order other than what is illustrated or described herein. Furthermore, the terms "include" and "have" and any variations thereof, are intended to cover non-exclusive inclusion, e.g., processes, methods, systems, products, or devices that include a series of steps or modules need not to be limited to those explicitly listed steps or modules, but may include other steps or modules not expressly listed or inherent to these processes, methods, products, or devices. The division of the modules herein is merely a logical division, and another division manner may be provided during actual implementation, for example, multiple modules can be combined or integrated into another system, or some of the features can be ignored, or not executed. In addition, the shown or discussed mutual coupling or direct coupling or communication connection may be through some interfaces. The indirect coupling or communication connection between the modules may be electrical or other similar forms, which are not limited herein. Moreover, the modules or sub-modules described as separate components may or may not be physically separated, may or may not be physical modules, or may be distributed to multiple circuit modules, and a part thereof or all the modules may be selected according to actual needs to achieve the objects of the solutions in the embodiments of the invention.

The embodiments of the present invention provide a positioning information transmission method and communication device, capable of reducing the storage space for wireless communication data occupied by compressed position information sent by the transmitting end, thus improving the transmission efficiency of a wireless communication system. The details will be described below.

Figure 1:
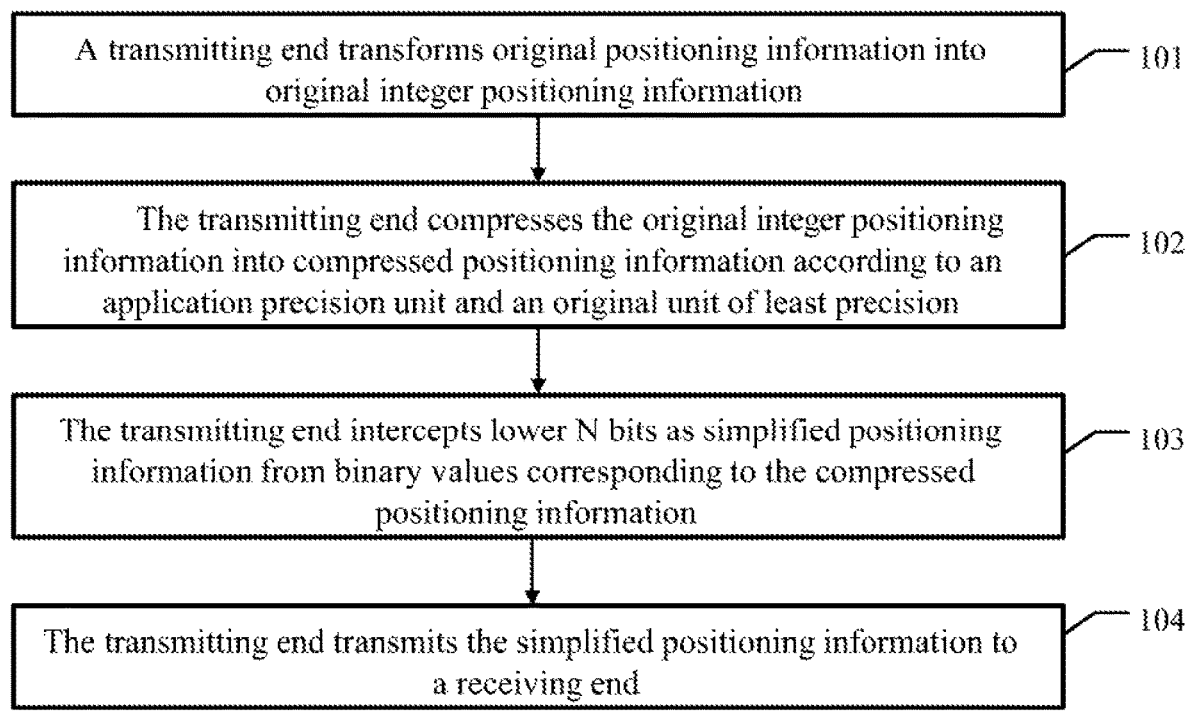
FIG. 1 is a flow chart of a positioning information transmission method at a transmitting end side according to an embodiment of the present invention.

Referring to FIG. 1. An embodiment of the present invention provides a positioning information transmission method, comprising the following steps.

In 101, a transmitting end transforms original positioning information into original integer positioning information.

In the field of applications for transmitting positioning information through wireless communication, the global positioning information is essential information in many applications and can be transmitted in different formats in different applications. The positioning information transmission method, apparatus and system in the embodiments of the present invention are applicable to a variety of global positioning information in different formats. In the embodiment of the present invention and all the subsequent embodiments, an example is given by using a common format (NMEA format) of current global positioning information transmission.

When the global positioning information of the transmitting end is transmitted in the NMEA format, the global positioning information in the NMEA format is in a binary storage manner. The global positioning information in the NMEA format is an absolute geographical position and is referred to as original positioning information. As shown in Table 1, each first positioning information comprises eight data parameters, which occupy 57-bit storage space.

TABLE 1

| Name of information unit | Storage space occupied (bit) | Range of value | Meaning expressed |
| --- | --- | --- | --- |
| NS | 1 | 0 | South latitude |
|  |  | 1 | North latitude |
| EW | 1 | 0 | West longitude |
|  |  | 1 | East longitude |
| NDEG | 7 | 0-89 | Latitude |
| NMINmm | 6 | 0-59 | Integer part of minute values of latitude |
| NMINF | 14 | 0-9999 | Decimal part of minute values of latitude |
| EDEG | 8 | 0-179 | Longitude |
| EMINmm | 6 | 0-59 | Integer part of minute values of longitude |
| EMINF | 14 | 0~9999 | Decimal part of minute values of longitude |

In order to improve the transmission efficiency, the transmitting end transforms the original positioning information in the NMEA format into original integer positioning information, wherein the original integer positioning information is an integer value of the original positioning information. To be specific, a longitude value in the original integer positioning information is transformed into an original integer longitude value, and a latitude value in the original integer positioning information is transformed into an original integer latitude value.

It should be noted that the embodiment of the present invention and the subsequent embodiments may be specifically applied to two-way radio communications and other wireless communications application fields. If the embodiment of the present invention is applied to two-way radio communications, the transmitting terminal may either be a two-way radio or an EnodeB, and the receiving end may either be an intercom or an EnodeB. The details are not restricted in the embodiment of the present invention.

In 102, the transmitting end compresses the original integer positioning information into compressed positioning information according to an application precision unit and an original unit of least precision.

Different original global positioning information formats have different units of least precision. Taking the NMEA format as an example, the NMEA format uses 57 binary numbers to represent longitude and latitude information of any position on the earth, and can provide position resolution precision of about 0.1852 m. This resolution precision is called the original unit of least precision.

Different wireless communication applications have different application precision requirements. For example, according to the device positioning precision of about 5 meters at current, the original one-dimensional resolution of the longitude and latitude can be adjusted to about 2.9634 m, and the correspondingly minimum two-dimensional resolution is about 4.1909 m.

The transmitting end can further compress the positioning information by sacrificing some resolution according to the precision requirements of different applications. Specifically, the transmitting end transforms the original integer positioning information into the compressed positioning information corresponding to the application precision according to a ratio between the application precision and the original unit of least precision. Because the application precision unit is greater than the original unit of least precision, the number of binary bits corresponding to the compressed positioning information is less than the number of binary bits corresponding to the original integer positioning information after the transformation.

Specifically, the original integer longitude value of the original integer positioning information is transformed into a compressed longitude value, and the original integer latitude value of the original integer positioning information is transformed into a compressed latitude value.

In 103, the transmitting end intercepts lower N bits as simplified positioning information from binary values corresponding to the compressed positioning information.

Because a wireless communication distance between the transmitting end and the receiving end is limited and a maximum distance is the maximum coverage radius $R_0$ of the wireless communication, the upper bit values of the positioning information of the transmitting end and the receiving end are the same, and the different lower bit values can be calculated according to $R_0$. Therefore, the receiving end can restore the integral positioning information of the transmitting end through calculation as long as the transmitting end transmits the lower bit values of the positioning information thereof to the receiving end.

After the transmitting end transforms the original integer positioning information into the compressed positioning information corresponding to the application precision, the simplifying parameter N of the positioning information appointed is calculated according to the wireless communication distance $R_0$ between the transmitting end and the receiving end by the following formula: $N=\log_2 R$, wherein N is the number of lower binary bits corresponding to the positioning information, which is the discriminative number of lower bits of the positioning information between the transmitting end and the receiving end. $R_0$ is the radius corresponding to the application precision unit, when $R_0$ is transformed into a radius R calculated by the original unit of least precision, R is a ratio of $R_0$ to the application precision unit, i.e., taking the device positioning precision of about 5 m at current for an example, the application precision thereof is the original one-dimensional resolution of the longitude and latitude (2.9634 m), then $R=R_0/2.9634$.

After obtaining the simplifying parameter N through calculation, the transmitting end intercepts lower N bits from the binary values corresponding to the compressed positioning information as the simplified positioning information, which is distinguishing from the positioning information of the receiving end.

It should be noted that, the wireless communication distance between the receiving end and the transmitting end here is well known, and is the direct communication distance between two terminals or devices without using a relay station.

In 104, the transmitting end transmits the simplified positioning information to the receiving end.

After intercepting the lower N bits as the simplified positioning information from the binary values corresponding to the compressed positioning information, the transmitting end transmits the simplified positioning information to the receiving end, then the receiving end can restore the original positioning information of the transmitting end through the simplified positioning information and with reference to the upper bit value of the positioning information thereof.

In the embodiment of the present invention, the transmitting end does not directly transmit the original positioning information, but transforms the original positioning information into the original integer positioning information; then compresses the original integer positioning information into the compressed positioning information according to the application precision unit and the original unit of least precision; afterwards, intercepts the lower N bits as the simplified positioning information from the binary values corresponding to the compressed positioning information, wherein the simplified positioning information is a bit distinguishing from the positioning information of the receiving end, the upper bit of the binary number corresponding to the compressed positioning information of the receiving end is the same as the upper bit of the binary number corresponding to the compressed positioning information of the transmitting end; therefore, the receiving end can restore the original positioning information as long as the transmitting end transits the simplified positioning information to the receiving end. Therefore, the storage space of wireless communication data occupied by the compressed positioning information transmitted by the transmitting end can be reduced under the precise of ensuring that the receiving end can obtain the valid positioning information of the transmitting end, which implements to transmit other valid information of more terminals in the same wireless communication data capacity, thus improving the transmission efficiency of the wireless communication system.

Further, in a specific embodiment, if the original positioning information is defined in an NMEA format, then the transmitting end may transform the original positioning information into the original integer positioning information specifically as follows.

A longitude value in the original positioning information is transformed into an original integer longitude value by calculating the following formula:

$$L_{jo}=Ew*108*10^6+E_{DEG}*6*10^5+E_{MINmm}*10^4+E_{MINF};$$

wherein $L_{jo}$ is an original integer longitude value in the original integer positioning information, Ew is an east-west longitude indicated value of the original positioning information, $E_{DEG}$ is a longitude of the original positioning information, $E_{MINmm}$ is an integer part of minute values of the longitude of the original positioning information, and $E_{MINF}$ is a decimal part of the minute values of the longitude of the original positioning information.

The specific principle is that the east-west longitude values, the longitude value, and the integer part of the minute values of the longitude in the longitude values of the original positioning information are all transformed into the numerical values corresponding to the decimal part of the minute values of the longitude, and then the integer values and the decimal part of the minute values of the longitude are added to obtain the original integer longitude value.

A latitude value in the original positioning information is transformed into the original integer latitude value by calculating the following formula:

$$L_{wo}=Ns*54*10^6+N_{DEG}*6*10^5+N_{MINmm}*10^4+N_{MINF};$$

$L_{wo}$ is an original integer latitude value in the original integer positioning information, Ns is a south-northern latitude indicated value of the original positioning information, $N_{DEG}$ is a latitude of the original positioning information, $N_{MINmm}$ is an integer part of minute values of the latitude of the original positioning information, and $N_{MINF}$ is a decimal part of the minute values of the latitude of the original positioning information.

The specific principle is that the north-south latitude values, the latitude value, and the integer part of the minute values of the latitude in the latitude values of the original positioning information are all transformed into the numerical values corresponding to the decimal part of the minute values of the latitude, and then the integer values and the decimal part of the minute values of the latitude are added to obtain the original integer latitude value.

In the embodiment of the present invention, taking the original positioning information in an NMEA format as an example, the original positioning information is transformed into the original integer positioning information by specific calculation formulas, thereby improving the feasibility of the solution.

Further, in a specific embodiment, the transmitting end compresses the original integer positioning information into the compressed positioning information according to the application precision unit and the original unit of least precision through a following manner:

the transmitting end obtains in according to the application precision unit and the original unit of least precision, which is specifically as follows:

application precision unit=$2^m$* original unit of least precision; the transmitting end respectively compresses the longitude value and the latitude value of the original integer positioning information into the longitude value and the latitude value of the compressed positioning information by calculating the following formulas:

$$L_j=L_{jo}/2^m;$$

$$L_w=L_{wo}/2^m;$$

wherein $L_j$ is a compressed longitude value in the compressed positioning information, and $L_w$ is a compressed latitude value in the compressed positioning information.

In the embodiment of the present invention, the original integer positioning information is compressed into the compressed positioning information through specific calculation formulas, thereby improving the feasibility of the solution.

The above is the introduction of the positioning information transmission method in the embodiment of the present invention from the perspective of the transmitting end. The positioning information transmission method in the embodiment of the present invention is described in detail hereinafter from the perspective of the receiving end.

Figure 2:
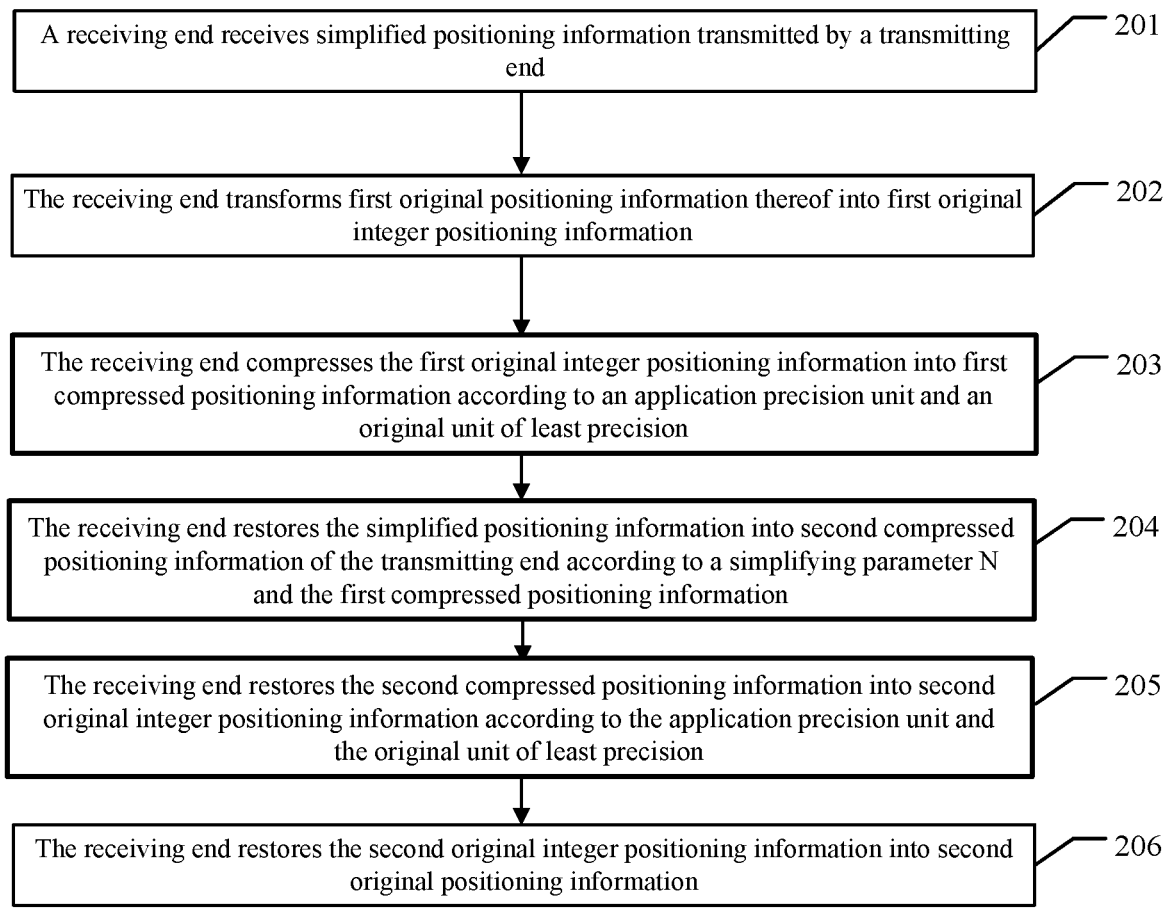
FIG. 2 is a flow chart of a positioning information transmission method at a receiving end side according to an embodiment of the present invention.

Referring to FIG. 2. An embodiment of the application provides a positioning information transmission method, including the following steps.

In 201, a receiving end receives simplified positioning information transmitted by a transmitting end.

After the transmitting end compresses original positioning information into the simplified positioning information and transmits the information to the receiving end, the receiving end receives the simplified positioning information transmitted by the transmitting end.

It should be noted that the embodiment of the present invention may be applied to two-way radio communications and other wireless communications application fields. If the embodiment of the present invention is applied to two-way radio communications, the transmitting terminal may either be a two-way radio or an EnodeB, and the receiving end may either be a two-way radio or an EnodeB. The details are not restricted in the embodiment of the present invention.

In 202, the receiving end transforms first original positioning information thereof into first original integer positioning information.

In the embodiment of the present invention, the receiving end and the transmitting end are both added with the positioning information of a global positioning system (GPS, Global Positioning System). After the receiving end receives the simplified positioning information of the transmitting end, because the simplified positioning information is not the original positioning information of the transmitting end, i.e., the simplified positioning information is only a lower bit value of the positioning information of the transmitting end rather than an absolute value of the positioning information, the receiving end only needs to calculate with reference to the positioning information thereof with the simplified positioning information, so as to restore the positioning information of the transmitting end.

Therefore, the receiving end acquires the original positioning information thereof, and the original positioning information is called as the first original positioning information.

The receiving end transforms the first original positioning information in an NMEA format into the first original integer positioning information, wherein the first original integer positioning information is an integer value of the first original positioning information. To be specific, a longitude value in the first original integer positioning information is transformed into a first original integer longitude value, and a latitude value in the first original integer positioning information is transformed into a first original integer latitude value.

In 203, the receiving end compresses the first original integer positioning information into first compressed positioning information according to an application precision unit and an original unit of least precision.

During practical application, different original global positioning information formats have different units of least precision. Taking the NMEA format as an example, the NMEA format uses 57 binary numbers to represent longitude and latitude information of any position on the earth, and can provide position resolution precision of about 0.1852 meters. This resolution precision is called the original unit of least precision.

Different wireless communication applications will have different application precision requirements. For example, according to the device positioning precision of about 5 meters at current, the original one-dimensional resolution of the longitude and latitude can be adjusted to about 2.9634 m, and the correspondingly minimum two-dimensional resolution is about 4.1909 m.

The receiving end can further compress the positioning information by sacrificing some resolution according to the precision requirements of different applications. Specifically, the receiving end transforms the first original integer positioning information into the first compressed positioning information corresponding to the application precision according to a ratio between the application precision and the original unit of least precision. Because the application precision unit is greater than the original unit of least precision, the number of binary bits corresponding to the first compressed positioning information is less than the number of binary bits corresponding to the first original integer positioning information after the transformation.

Specifically, the original integer longitude value of the first original integer positioning information is transformed into a first compressed longitude value, and the original integer latitude value of the first original integer positioning information is transformed into a first compressed latitude value.

In 204, the receiving end restores the simplified positioning information into second compressed positioning information of the transmitting end according to a simplifying parameter N and the first compressed positioning information.

Because a wireless communication distance between the transmitting end and the receiving end is limited and a maximum distance is the maximum coverage radius $R_0$ of the wireless communication, the upper bit values of the positioning information of the transmitting end and the receiving end are the same, the receiving end can restore the integral positioning information of the transmitting end as long as the receiving end calculates the upper bit value of the first compressed positioning information thereof.

A specific calculation principle is as follows:

After the receiving end transforms the original integer positioning information into the compressed positioning information corresponding to the application precision, the simplifying parameter N of the positioning information appointed is calculated according to a ratio R of the wireless communication distance between the transmitting end and the receiving end to the application precision unit by the following formula: $N=\log_2 R$. N is the number of lower binary bits corresponding to the positioning information.

After obtaining the simplifying parameter N by calculation, the receiving end intercepts an upper bit value of the first compressed positioning information from the binary values corresponding to the compressed positioning information according to the parameter N, wherein the upper bit value is the upper bit value of the transmitting end; therefore, the receiving end can obtain the second compressed positioning information of the transmitting end by splicing the upper bit value with the simplified positioning information of the transmitting end.

It should be noted that, the wireless communication distance between the receiving end and the transmitting end here is well known, and is the direct communication distance between two terminals or devices without using a relay station.

In 205, the receiving end restores the second compressed positioning information into second original integer positioning information according to the application precision unit and the original unit of least precision.

After obtaining the second compressed positioning information of the transmitting end through calculation, the receiving end restores the second compressed positioning information into the second original integer positioning information according to the application precision unit and the original unit of least precision. A specific restoring method is a reversible method for the receiving end to compress the first original integer positioning information into the first compressed positioning information in step 203, and will not be specifically elaborated here.

In 206, the receiving end restores the second original integer positioning information into second original positioning information.

The receiving end restores the second compressed positioning information into the second original integer positioning information according to the application precision unit and the original unit of least precision, and then restores the second original integer positioning information into the second original positioning information. A specific restoring method is a reversible method for the receiving end to transform the first original integer positioning information thereof into the first original integer positioning information in step 202, and will not be specifically elaborated here.

The second original positioning information is the absolute geographical position information of the transmitting end, and the receiving end can obtain the specific position of the transmitting end according to the geographical position information.

In the embodiment of the present invention, after the receiving end receives the simplified positioning information transmitted by the transmitting end, the receiving end transforms to the first original positioning information thereof into the first original integer positioning information, then compresses the first original integer positioning information into the first compressed positioning information according to the application precision unit and the original unit of least precision, restores the simplified positioning information into the second compressed positioning information of the transmitting end according to the simplifying parameter N and the first compressed positioning information, then restores the second compressed positioning information into the second original integer positioning information according to the application precision unit and the original unit of least precision; and restores the second original integer positioning information into the second original positioning information. Therefore, the simplified positioning information transmitted by the transmitting end can be restored into the original positioning information; therefore, the storage space of wireless communication data occupied by the compressed positioning information transmitted by transmitting end can be reduced under the precise of ensuring that the receiving end can obtain the valid positioning information of the transmitting end, which implements to transmit other valid information of more terminals in the same wireless communication data capacity, thus improving the transmission efficiency of the wireless communication system.

Further, in a specific embodiment, if the first original positioning information of the receiving end is defined in an NMEA format, then the receiving end may transform the first original positioning information into the first original integer positioning information specifically as follows.

A longitude value in the first original positioning information is transformed into a first original integer longitude value by calculating the following formula:

$$L_{jRo} = Ew*108*10^6 + E_{DEG}*6*10^5 + E_{MINmm}*10^4 + E_{MINF};$$

wherein $L_{jo}$ is a first original integer longitude value in the first original integer positioning information, Ew is an east-west longitude indicated value of the first original positioning information, $E_{DEG}$ is a longitude of the first original positioning information, $E_{MINmm}$ is an integer part of minute values of the longitude of the first original positioning information, and $E_{MINF}$ is a decimal part of the minute values of the longitude of the first original positioning information.

The specific principle is that the east-west longitude values, the longitude value, and the integer part of the minute values of the longitude in the longitude values of the first original positioning information are all transformed into the numerical value corresponding to the decimal part of the minute values of the longitude, and then the integer values and the decimal part of the minute values of the longitude are added to obtain the first original integer longitude value.

A latitude value in the first original positioning information is transformed into a first original integer latitude value by calculating the following formula:

$$L_{wRo} = Ns*54*10^6 + N_{DEG}*6*10^5 + N_{MINmm}*10^4 + N_{MINF};$$

wherein $L_{wRo}$ is an original integer latitude value in the first original integer positioning information, Ns is a south-northern latitude indicated value of the first original positioning information, $N_{DEG}$ is a latitude of the first original positioning information, $N_{MINmm}$ is an integer part of minute values of the latitude of the first original positioning information, and $N_{MINF}$ is a decimal part of the minute values of the latitude of the first original positioning information.

The specific principle is that the north-south latitude values, the latitude value, and the integer part of the minute values of the latitude in the latitude values of the first original positioning information are all transformed into the numerical values corresponding to the decimal part of the minute values of the latitude, and then the integer values and the decimal part of the minute values of the latitude are added to obtain the original integer latitude value.

In the embodiment of the present invention, taking the original positioning information in an NMEA format as an example, the original positioning information of the receiving end is transformed into the original integer positioning information by a specific calculation formula, thereby improving the feasibility of the solution.

Further, based on the last embodiment, and in a specific embodiment, the transmitting end can compress the original integer positioning information into the compressed positioning information according to the application precision unit and the original unit of least precision through a following manner specifically:

the receiving end obtains in according to the application precision unit and the original unit of least precision, which is specifically as follows:

application precision unit=$2^m$* original unit of least precision;

the receiving end respectively compresses the longitude value and the latitude value of the first original integer positioning information into the longitude value and the latitude value of the first compressed positioning information by calculating the following formulas:

$$L_{jR} = L_{jRo}/2^m;$$

$$L_{wR} = L_{wRo}/2^m;$$

wherein $L_{jR}$ is a compressed longitude value in the compressed positioning information, and $L_{wR}$ is a compressed latitude value in the compressed positioning information.

In the embodiment of the present invention, the first original integer positioning information of the receiving end is compressed into the first compressed positioning information through specific calculation formulas, thereby improving the feasibility of the solution.

Further, based on the last embodiment, and in a specific embodiment, the receiving end can restore the simplified positioning information into the second compressed positioning information of the transmitting end according to the simplifying parameter N and the first compressed positioning information through a following manner specifically:

when restoring the compressed positioning information, a lower bit may be added or subtracted; three adjacent upper bit values of the first compressed positioning information are calculated first, which are respectively the upper bit value of the first compressed positioning information, the upper bit value of the first compressed positioning information minus 1, and the upper bit value of the first compressed positioning information plus 1. Then, the three upper bit values are respectively spliced with the simplified positioning information of the transmitting end to obtain three compressed positioning information, and then the three compressed positioning information obtained by splicing are respectively subtracted by the first compressed positioning information of the receiving end, wherein the one with a difference less than $2^N$ is the second compressed positioning information of the transmitting end.

To be specific, when restoring the second compressed positioning information, the compressed longitude value and the compressed latitude value of the second compressed positioning information are respectively restored. Instructions are given below respectively.

I. Restore the longitude value of the second compressed positioning information:

1. The receiving end intercepts upper bits from the binary values corresponding to the longitude value of the first compressed positioning information as the longitude value of the first upper bit value of the first compressed positioning information. The number of upper bits is the total number of the binary values corresponding to the longitude value of the first compressed positioning information minus N bits. It can be specifically calculated according to the following formula: $L_{jRH0}=L_{jR}\&(0xFFFFFF<<N)$.

Then the longitude value of the first upper bit value and the longitude value of the simplified positioning information are spliced to obtain a longitude value of third compressed positioning information, wherein the specific splicing manner is to perform an OR operation on the binary values of the two by the calculation formula: $L_{j1}=L_{jRH0}|L_{jN}$.

If the absolute value of the difference between the longitude value of the third compressed positioning information and the longitude value of the first compressed positioning information is less than $2^N$, then the receiving end can determine that the longitude value of the third compressed positioning information is the longitude value of the second compressed positioning information.

2. The receiving end intercepts an upper bit from the binary values corresponding to the longitude value of the first compressed positioning information, wherein the number of upper bits is the total bits of the binary values corresponding to the longitude value of the first compressed positioning information minus N bits, and then 1 is subtracted from the number of upper bits. It can be specifically calculated according to the following formula: $L_{jRH-1}=L_{jR}\&(0xFFFFFF<<N)-(1<<N)$.

Then the longitude value of the second upper bit value and the longitude value of the simplified positioning information are spliced to obtain a longitude value of fourth compressed positioning information, wherein the specific splicing manner is to perform an OR operation on the binary values of the two by the calculation formula: $L_{j2}=L_{jRH-1}|L_{jN}$.

If the absolute value of the difference between the longitude value of the fourth compressed positioning information and the longitude value of the first compressed positioning information is less than $2^N$, then the receiving end can determine that the longitude value of the fourth compressed positioning information is the longitude value of the second compressed positioning information.

3. The receiving end intercepts upper bits from the binary values corresponding to the longitude value of the first compressed positioning information, wherein the number of upper bits is the total bits of binary values corresponding to the longitude value of the first compressed positioning information minus N bits, and then the number of upper bits is added with 1. It can be specifically calculated according to the following formula: $L_{jRH+1}=L_{jR}\&(0xFFFFFF<<N)+(1<<N)$.

Then the longitude value of the third upper bit value and the longitude value of third simplified positioning information are spliced to obtain a longitude value of fifth compressed positioning information, wherein the specific splicing manner is to perform an OR operation on the binary values of the two by the calculation formula: $L_{j3}=L_{jRH+1}|L_{jN}$.

If the absolute value of the difference between the longitude value of the fifth compressed positioning information and the longitude value of the first compressed positioning information is less than 2N, then the receiving end can determine that the longitude value of the fifth compressed positioning information is the longitude value of the second compressed positioning information.

II. Restore the latitude value of the second compressed positioning information:

1. The receiving end intercepts upper bits from the binary values corresponding to the latitude value of the first compressed positioning information as the latitude value of the first upper bit value of the first compressed positioning information. The number of upper bits is the total number of binary values corresponding to the latitude value of the first compressed positioning information minus N bits. It can be specifically calculated according to the following formula: $L_{wRH0}=L_{wR}\&(0xFFFFFF<<N)$.

Then the latitude value of the first upper bit value and the latitude value of the simplified positioning information are spliced to obtain a latitude value of the third compressed positioning information, wherein the specific splicing manner is to perform an OR operation on the binary values of the two by the calculation formula: $L_{w1}=L_{wRH}|L_{wN}$.

If the absolute value of the difference between the latitude value of the third compressed positioning information and the latitude value of the first compressed positioning information is less than $2^N$, then the receiving end determines that the latitude value of the third compressed positioning information is the latitude value of the second compressed positioning information.

2. The receiving end intercepts upper bits from the binary values corresponding to the latitude value of the first compressed positioning information, wherein the number of upper bits is the total bits of binary values corresponding to the latitude value of the first compressed positioning information minus N bits, and then 1 is subtracted from the number of upper bits. It can be concretely calculated according to the following formula: $L_{wRH-1}=L_{wR}\&(0xFFFFFF<<N)-(1<<N)$.

Then the latitude value of the second upper bit value and the latitude value of the simplified positioning information are spliced to obtain a latitude value of the fourth compressed positioning information, wherein the specific splicing manner is to perform an OR operation on the binary values of the two by the calculation formula: $L_{w2}=L_{wRH-1}|L_{wN}$.

If the absolute value of the difference between the latitude value of the fourth compressed positioning information and the latitude value of the first compressed positioning information is less than $2^N$, then the receiving end determines that the latitude value of the fourth compressed positioning information is the latitude value of the second compressed positioning information.

3. The receiving end intercepts upper bits from the binary values corresponding to the latitude value of the first compressed positioning information, wherein the number of upper bits is the total bits of binary values corresponding to the latitude value of the first compressed positioning information minus N bits, and then the number of upper bits is added with 1. It can be concretely calculated according to the following formula: $L_{wRH+1}=L_{wR}\&(0xFFFFFF<<N)+(1<<N)$.

Then the latitude value of the third upper bit value and the latitude value of the third simplified positioning information are spliced to obtain a latitude value of the fifth compressed positioning information, wherein the specific splicing manner is to perform an OR operation on the binary values of the two by the calculation formula: $L_{w3}=L_{wRH+1}|L_{wN}$.

If the absolute value of the difference between the latitude value of the fifth compressed positioning information and the latitude value of the first compressed positioning information is less than $2^N$, then the receiving end determines that the latitude value of the fifth compressed positioning information is the latitude value of the second compressed positioning information.

Further, based on last embodiment, and in another embodiment, the receiving end transforms the second compressed positioning information into the second original integer positioning information according to the application precision unit and the original unit of least precision by the following formulas:

$$L_{jo}=L_j*2^m;$$

$$L_{wo}=L_w*2^m;$$

The in here is the same as the in found in the foregoing embodiment, which is the in obtained by the receiving end according to the application precision unit and the original unit of least precision, as follows:

application precision unit=$2^m$* original unit of least precision;

wherein $L_{jo}$ is an original integer longitude value of the second original integer positioning information, $L_{wo}$ is an original integer latitude value of the second original integer positioning information, $L_j$ is a compressed longitude value of the second compressed positioning information, and $L_w$ is a compressed latitude value of the second compressed positioning information.

Further, based on last embodiment, and in a specific embodiment, the receiving end restores the second original integer positioning information into the second original positioning information specifically as follows:

the receiving end judges whether $L_{jo}$ is less than $108*10^6$, wherein an east longitude E'w of the second original positioning information is equal to 0 if $L_{jo}$ is less than $108*10^6$, and the east longitude E'w of the second original positioning information is equal to 1 if $L_{jo}$ is no less than $108*10^6$;

the receiving end obtains a longitude $E'_{DEG}$ of the second original positioning information, an integer part of minute values of the longitude $E'_{MINmm}$ of the second original positioning information, and a decimal part of the minute values of the longitude $E'_{MINF}$ of the second original positioning information by calculating the following formulas:

$$E'_{DEG}=L'_{jo}\%(108*10^6)/(6*10^5);$$

$$E'_{MINmm}=L'_{jo}\%(108*10^6)/(10^4);$$

$$E'_{MINF}=L'_{jo}\%10^4;$$

the receiving end judges whether $L_{wo}$ is less than $54*10^6$, wherein a northern latitude N's of the second original positioning information is equal to 0 if L is less than $54*10^6$, and the northern latitude N's of the second original positioning information is equal to 1 if $L_{wo}$ is no less than $54*10^6$; and the receiving end obtains a latitude $N'_{DEG}$ of the second original positioning information, an integer part of minute values of the latitude $N'_{MINmm}$ of the second original positioning information, and a decimal part of the minute values of the latitude $N'_{MINF}$ of the second original positioning information by calculating the following formulas:

$$N'_{DEG}=L'_{wo}\%(54*10^6)/(6*10^5);$$

$$N'_{MINmm}=L'_{wo}\%(54*10^6)/(10^4);$$

$$N'_{MINF}=L'_{wo}\%10^4.$$

For ease of understanding, the following describes the embodiment of the present invention in detail in a specific application scenario. Another embodiment of the present invention comprises:

original positioning information in an NMEA format is adopted in the transmitting end, and the specific position is as shown in Table 2.

TABLE 2

| Name of information unit | Length (bit) | Value | Note |
|---|---|---|---|
| NS | 1 | 1 | North latitude |
| EW | 1 | 1 | East longitude |
| NDEG | 7 | 22 | Latitude |
| NMINmm | 6 | 37 | Integer part of minute values of latitude |
| NMINF | 14 | 4000 | Decimal part of minute values of latitude |
| EDEG | 8 | 114 | Longitude |
| EMINmm | 6 | 4 | Integer part of minute values of longitude |
| EMINF | 14 | 4000 | Decimal part of minute values of longitude |

The corresponding original integer longitude value $L_{jo}$ and original integer latitude value $L_{wo}$ of the original integer positioning information are as follows:

$$\begin{aligned}L_{jo} &= E_w*108*10^6 + E_{DEG}*6*10^5 + E_{MINmm}*10^4 + E_{MINF} \\ &= 1*108*10^6 + 114*6*10^5 + 4*10^4 + 4000 \\ &= 176444000\end{aligned}$$

$$\begin{aligned}L_{wo} &= N_s*54*10^6 + N_{DEG}*6*10^5 + N_{MINmm}*10^4 + N_{MINF} \\ &= 1*54*10^6 + 22*6*10^5 + 37*10^4 + 4000 \\ &= 67574000\end{aligned}$$

The original unit of least precision of the positioning information in the NMEA format is about 0.1852 m. According to the device positioning precision of about 5 m at current, two-dimensional application precision unit should be less than 5 m. One-dimensional application precision unit is calculated according to the following formula:

application precision unit=$2^m$* original unit of least precision, wherein the value of in is 4, and the one-dimensional application precision unit about 2.9634 m and the two-dimensional application precision unit about 4.1909 m can be obtained.

Therefore, the original integer positioning information is compressed into the compressed positioning information according to the following formula, wherein the corresponding compressed longitude value $L_{jR}$ and the corresponding compressed latitude value $L_{wR}$ are as follows:

$$L_j = L_{jo}/2^4 = 176444000/2^4 = 11027750 = 0xA84526$$

$$L_w = L_{wo}/2^4 = 67574000/2^4 = 4223375 = 0x40718F$$

The maximum wireless communication distance between the transmitting end and the receiving end is $R_0$ km, and the value is the maximum distance corresponding to the application precision unit. The maximum distance under the unit of least precision is obtained through precision conversion that $R=R_0$/one-dimensional application precision unit, and the value of the corresponding N can be obtained by calculating according to the formula $N=\log_2 R$, which is as shown in Table 3.

TABLE 3

| N bit | R km | Total bits in simplified format |
|---|---|---|
| 10 | 3.03 | 20 |
| 11 | 6.07 | 22 |
| 12 | 12.14 | 24 |
| 13 | 24.28 | 26 |
| 14 | 48.55 | 28 |

The maximum wireless communication distance between the transmitting end and the receiving end is about 12 km, then the corresponding value of N is 12.

The corresponding longitude value $L_{jN}$ and the corresponding latitude value $L_{wN}$ of the simplified positioning information are as follows:

$$L_{jN} = L_j \% 2^N = 0xA84526 \% 2^{12} = 0x526$$

$$L_{wN} = L_w \% 2^N = 0x40718F \% 2^{12} = 0x18F$$

The transmitting end transmits the simplified positioning information through wireless communication, wherein the following valid information of the lower 12 bits is transmitted only.

$$L_{jN} = 0x526$$

$$L_{wN} = 0x18F$$

The receiving end receives the simplified positioning information $L_{jN}$ and $L_{wN}$ transmitted by the transmitting end.

The original position information of the receiving end obtained by itself is as shown in Table 4.

TABLE 4

| Name of information unit | Length (bit) | Value | Note |
|---|---|---|---|
| NS | 1 | 1 | North latitude |
| EW | 1 | 1 | East longitude |
| NDEG | 7 | 22 | Latitude |
| NMINmm | 6 | 37 | Integer part of minute values of latitude |
| NMINF | 14 | 2000 | Decimal part of minute values of latitude |
| EDEG | 8 | 114 | Longitude |
| EMINmm | 6 | 4 | Integer part of minute values of longitude |
| EMINF | 14 | 2000 | Decimal part of minute values of longitude |

The longitude value $L_{jRo}$ and the latitude value $L_{wRo}$ in the original integer positioning information corresponding to the original positioning information of the receiving end are as follows:

$$L_{jRo} = E_w * 108 * 10^6 + E_{DEG} * 6 * 10^5 + E_{MINmm} * 10^4 + E_{MINF}$$
$$= 1 * 108 * 10^6 + 114 * 6 * 10^5 + 4 * 10^4 + 2000$$
$$= 176442000$$

$$L_{wRo} = Ns * 54 * 10^6 + N_{DEG} * 6 * 10^5 + N_{MINmm} * 10^4 + N_{MINF}$$
$$= 1 * 54 * 10^6 + 22 * 6 * 10^5 + 37 * 10^4 + 2000$$
$$= 67572000$$

The original unit of least precision of the positioning information in the NMEA format is about 0.1852 m. According to the device positioning precision of about 5 m, two-dimensional application precision unit should be less than 5 m. One-dimensional application precision unit is calculated according to the following formula:

application precision unit = $2^m$ * original unit of least precision, wherein the value of in is 4, and the one-dimensional application precision unit about 2.9634 m and the two-dimensional application precision unit about 4.1909 m can be obtained.

Therefore, the original integer positioning information of the receiving end is compressed into the compressed positioning information according to the following formula, wherein the corresponding compressed longitude value $L_{jR}$ and the corresponding compressed latitude value $L_{wR}$ are as follows:

$$L_{jR} = L_{jRo}/2^4 = 176442000/2^4 = 11027625 = 0xA844A9$$

$$L_{wR} = L_{wRo}/2^4 = 67572000/2^4 = 4223250 = 0x407112$$

The receiving end extracts the upper bit value $L_{jRH0}$ of the longitude value of the compressed positioning information thereof according to the following formula, and then subtracts 1 from the upper bit value of the longitude value to obtain $L_{jRH-1}$ according to the following formula, adds the upper bit value of the longitude value by 1 to obtain $L_{jRH-1}$, subtracts 1 from the upper bit value of the latitude value to obtain $L_{wRH-1}$, and adds the upper bit value of the latitude value by 1 to obtain $L_{wRH+1}$.

$$L_{jRH0} = 0xA844A9 \& (0xFFFFFF << 12) = 0xA84000;$$

$$L_{jRH-1} = 0xA844A9 \& (0xFFFFFF << 12) - (1 << N) = 0xA83000;$$

$$L_{jRH+1} = 0xA844A9 \& (0xFFFFFF << 12) + (1 << N) = 0xA85000;$$

the receiving end splices $L_{jRH0}$, $L_{jRH-1}$ and $L_{jRH-1}$ with the longitude value of the simplified positioning information (i.e., lower bit value) of the transmitting end respectively to restore the longitude values of three compressed positioning information.

$$L_{j1} = L_{jRH0} | L_{jN} = 0xA84000 | 0x000526 = 0xA84526 = 11027750;$$

$$L_{j2} = L_{jRH-1} | L_{jN} = 0xA83000 | 0x000526 = 0xA83526 = 11023654;$$

$$L_{j3} = L_{jRH+1} | L_{jN} = 0xA85000 | 0x000526 = 0xA85526 = 11031846;$$

the receiving end respectively calculates the differences between $L_{j1}$, $L_{j2}$ and $L_{j3}$, and the compressed positioning information $L_{jR}$ of the receiving end:

$$L_{j1} - L_{jR} = 0xA84526 - 0xA844A9 = 11027750 - 11027625 = 125;$$

$$L_{j2} - L_{jR} = 0xA83526 - 0xA844A9 = 11023654 - 11027625 = -3971;$$

$$L_{j3} - L_{jR} = 0xA85526 - 0xA844A9 = 11031846 - 11027625 = 4221;$$

the receiving end judges whether the absolute values of the three differences are less than $2^{12}$, i.e., less than 2048, wherein the value less than $2^{12}$ is the longitude value of the compressed positioning information of the transmitting end. Therefore, $L_{j1}$ is the longitude value of the compressed positioning information of the transmitting end.

The receiving end extracts the upper bit value $L_{wRH0}$ of the latitude value of the compressed positioning information thereof according to the following formula, and then subtracts 1 from the upper bit value of the latitude value to obtain LwRH−1 according to the following formula, and adds the upper bit value of the latitude value by 1 to obtain LwRH+1.

$$L_{wRH0}=0x407112\&(0xFFFFFF<<12)=0x407000$$

$$L_{wRH-1}=0x407112\&(0xFFFFFF<<12)-(1<<N)= 0x406000;$$

$$L_{wRH+1}=0x407112\&(0xFFFFFF<<12)+(1<<N)= 0x408000;$$

the receiving end splices $L_{wRH0}$, $L_{wRH-1}$ and $L_{wRH-1}$ with the latitude value of the simplified positioning information (i.e., lower bit value) of the transmitting end respectively to restore the latitude values of three compressed positioning information.

$$L_{w1}=L_{wRH0}|L_{wN}=0x40700010x00018F=0x40718F=4223375;$$

$$L_{w2}=L_{wRH-1}|L_{wN}=0x40600010x00018F=0x40618F= 4219279;$$

$$L_{w3}=L_{wRH-1}|L_{wN}=0x408000|0x00018F=0x40818F= 4227471;$$

the receiving end respectively calculates the differences between $L_{w1}$, $L_{w2}$ and $L_{w3}$, and the compressed positioning information $L_{wR}$ of the receiving end:

$$L_{w1}-L_{wR}=0x40718F-0x407112=4223375- 4223250=125;$$

$$L_{w2}-L_{wR}=0x40618F-0x407112=4219279- 4223250=-3971;$$

$$L_{w3}-L_{wR}=0x40818F-0x407112=4227471- 4223250=4221;$$

the receiving end judges whether the absolute values of the three differences are less than 212, i.e., less than 2048, wherein the value less than 212 is the latitude value of the compressed positioning information of the transmitting end. Therefore, $L_{w1}$ is the latitude value of the compressed positioning information of the transmitting end.

Therefore, the receiving end obtains the compressed positioning information of the transmitting end as follows:

$$L_j=L_{j1}=0xA84526=11027750;$$

$$L_w=L_{w1}=0x40718F=4223375;$$

the receiving end restores the compressed positioning information calculated into the corresponding original integer positioning information according to the following formulas, wherein the longitude value $L_{jo}$ and the latitude value $L_{wo}$ are as follows:

$$L_{jo}=L_j*2^4=11027750*24=176444000;$$

$$L_{wo}=L_w*2^4=4223375*24=67574000;$$

the receiving end then restores the original integer positioning information calculated into the original positioning information of the transmitting end in the NMEA format:

$L_{jo}$ is 176444000, which is greater than $108*10^6$; therefore, Ew is equal to 1;

$$E_{DEG}=L_{jo}\%(108*10^6)/(6*10^5)=176444000\% (108*10^6)/(6*10^5)=114;$$

$$E_{MINmm}=L_{jo}\%(108*10^6)/(10^4)=176444000\% (108*10^6)/(10^4)=4;$$

$$E_{MINF}=L_{jo}\%10^4=176444000\%10^4=4000;$$

$L_{wo}$ is 67574000, which is greater than $54*10^6$; therefore, Ns is equal to 1;

$$N_{DEG}=L_{wo}\%(54*10^6)/(6*10^5)=67574000\%(54*10^6)/ (6*10^5)=22;$$

$$N_{MINmm}=L_{wo}\%(54*10^6)/(10^4)=67574000\%(54*10^6)/ (10^4)=37;$$

$$N_{MINF}=L_{wo}\%10^4=67574000\%10^4=4000.$$

The above is the introduction of the positioning information transmission method in the embodiments of the present invention. The communication device in the embodiments of the present invention is described hereinafter from the perspective of a modular functional entity.

Figure 3:
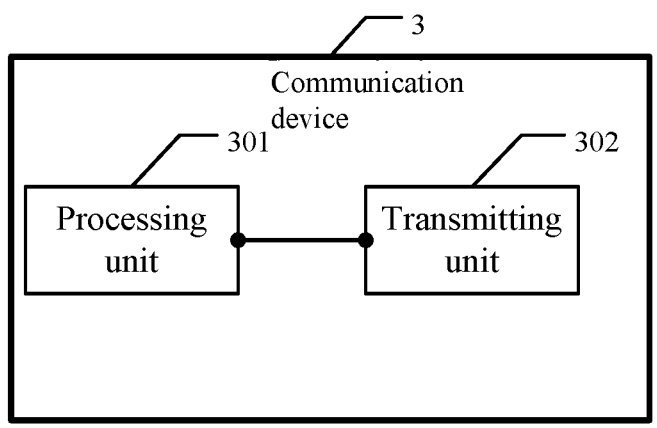
FIG. 3 is a modular schematic diagram of a communication device according to an embodiment of the present invention.

With reference to FIG. 3, a communication device 3 provided by an embodiment of the present invention comprises:

a processing unit 301, configured to transform original positioning information into original integer positioning information, wherein the original integer positioning information is an integer value of the original positioning information; compress the original integer positioning information into compressed positioning information according to an application precision unit and an original unit of least precision, wherein the number of binary bits corresponding to the compressed positioning information is less than the number of binary bits corresponding to the original integer positioning information; and then intercept lower N bits as simplified positioning information from binary values corresponding to the compressed positioning information, wherein N is equal to $\log_2 R$, and R is a ratio of a maximum wireless communication distance between the transmitting end and the receiving end to the application precision unit; and a transmitting unit 302, configured to transmit the simplified positioning information to the receiving end.

For the interaction process between units of the communications device 3 in the embodiment of the present invention, reference may be made to the interaction process in the foregoing embodiment as shown in FIG. 1, and will not be elaborated herein.

In the embodiment of the present invention, the transmitting unit 302 in the communication device 3 does not directly transmit the original positioning information; instead, the processing unit 301 transforms the original positioning information into the original integer positioning information; then compresses the original integer positioning information into the compressed positioning information according to the application precision unit and the original unit of least precision; afterwards, intercepts the lower N bits as the simplified positioning information from the number of bits corresponding to the compressed positioning information, wherein the simplified positioning information is a bit distinguishing from the positioning information of a device at the receiving end, the upper bit of the binary number corresponding to the compressed positioning information of the receiving device is the same as the upper bit of the binary number corresponding to the compressed positioning information of the transmitting end; therefore, the receiving device can restore the original positioning information of the communication device 3 as long as the transmitting unit 302 transits the simplified positioning information to the receiving device. Therefore, the storage space of wireless communication data occupied by the compressed positioning information transmitted by the communication device 3 can be reduced under the precise of ensuring that the receiving device can obtain the valid positioning information of the transmitting end, which implements to transmit other valid information of more terminals in the same wireless communication data capacity, thus improving the transmission efficiency of the wireless communication system.

Further, as another embodiment, the processing unit 301 is specifically configured to transform the original positioning information into the original integer positioning information by calculating the following formulas:

$$L_{jo}=Ew*108*10^6+E_{DEG}*6*10^5+E_{MINmm}*10^4+E_{MINF};$$

$$L_{wo}=Ns*54*10^6+N_{DEG}*6*10^5+N_{MINmm}*10^4+N_{MINF};$$

wherein $L_{jo}$ is an original integer longitude value in the original integer positioning information, Ew is an east-west longitude indicated value of the original positioning information, $E_{DEG}$ is a longitude of the original positioning information, $E_{MINmm}$ is an integer part of minute values of the longitude of the original positioning information, and $E_{MINF}$ is a decimal part of the minute values of the longitude of the original positioning information; and $L_{wo}$ is an original integer latitude value in the original integer positioning information, Ns is a south-northern latitude indicated value of the original positioning information, $N_{DEG}$ is a latitude of the original positioning information, $N_{MINmm}$ is an integer part of minute values of the latitude of the original positioning information, and $N_{MINF}$ is a decimal part of the minute values of the latitude of the original positioning information.

Further, as another embodiment, the processing unit 301 is specifically configured to compress the original integer positioning information into the compressed positioning information according to the application precision unit and the original unit of least precision by calculating the following formulas:

$$L_j=L_{jo}/2^m;$$

$$L_w=L_{wo}/2^m;$$

and then intercept lower N bits as simplified positioning information from binary values corresponding to the compressed positioning information, wherein N is equal to $\log_2 R$, and R is a ratio of a maximum wireless communication distance between the transmitting end and the receiving end to the application precision unit; and wherein $L_j$ is a compressed longitude value in the compressed positioning information, $L_w$ is a compressed latitude value in the compressed positioning information, and in is calculated and acquired through the following formula: application precision unit=$2^m*$ original unit of least precision.

Figure 4:
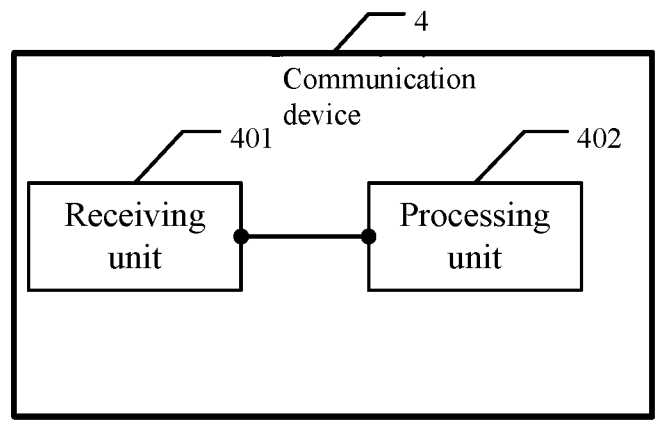
FIG. 4 is a modular schematic diagram of a communication device according to an embodiment of the present invention.

With reference to FIG. 4, a communication device 4 provided by an embodiment of the present invention comprises:

a receiving unit 401, configured to receive simplified positioning information transmitted by a transmitting end; and a processing unit 402, configured to transform first original positioning information thereof into first original integer positioning information, wherein the first original integer positioning information is an integer value of the first original positioning information; compress the first original integer positioning information into first compressed positioning information according to an application precision unit and an original unit of least precision, wherein the number of binary bits corresponding to the first compressed positioning information is less than the number of binary bits corresponding to the first original integer positioning information; afterwards, restore the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit; restore the second compressed positioning information into second original integer positioning information according to the application precision unit and the original unit of least precision; and restore the second original integer positioning information into second original positioning information.

For the interaction process between units of the communications device 4 in the embodiment of the present invention, reference may be made to the interaction process in the foregoing embodiment as shown in FIG. 2, and will not be elaborated herein.

In the embodiment of the present invention, after the receiving unit 401 of the communication device 4 receives the simplified positioning information transmitted by a transmitting device, the processing unit 402 transforms the first original positioning information thereof into the first original integer positioning information, then compresses the first original integer positioning information into the first compressed positioning information according to the application precision unit and the original unit of least precision, restores the simplified positioning information into the second compressed positioning information of the transmitting end according to the simplifying parameter N and the first compressed positioning information, restores the second compressed positioning information into the second original integer positioning information according to the application precision unit and the original unit of least precision; and restores the second original integer positioning information into the second original positioning information. Therefore, the simplified positioning information transmitted by the transmitting device can be restored into the original positioning information; therefore, the storage space of wireless communication data occupied by the compressed positioning information transmitted by transmitting end can be reduced under the precise of ensuring that the receiving end can obtain the valid positioning information of the transmitting end, which implements to transmit other valid information of more terminals in the same wireless communication data capacity, thus improving the transmission efficiency of the wireless communication system.

Further, as another embodiment, the processing unit 402 is specifically configured to transform the first original positioning information thereof into the first original integer positioning information by calculating the following formulas:

$$L_{jRo}=Ew*108*10^6+E_{DEG}*6*10^5+E_{MINmm}*10^4+E_{MINF};$$

$$L_{wRo}=Ns*54*10^6+N_{DEG}*6*10^5+N_{MINmm}*10^4+N_{MINF};$$

wherein $L_{jo}$ is an original integer longitude value in the first original integer positioning information, Ew is an east-west longitude indicated value of the first original positioning information, $E_{DEG}$ is a longitude of the first original positioning information, $E_{MINmm}$ is an integer part of minute values of the longitude of the first original positioning information, and $E_{MINF}$ is a decimal part of the minute values of the longitude of the first original positioning information; and $L_{wo}$ is an original integer latitude value in the first original integer positioning information, Ns is a south-northern latitude indicated value of the first original positioning information, $N_{DEG}$ is a latitude of the first original positioning information, $N_{MINmm}$ is an integer part of minute values of the latitude of the first original positioning information, and $N_{MINF}$ is a decimal part of the minute values of the latitude of the first original positioning information.

Further, as another embodiment, the processing unit 402 is specifically configured to compress the first original integer positioning information into the first compressed positioning information according to the application precision unit and the original unit of least precision by calculating the following formulas:

$$L_{jR}=L_{jRo}/2^m;$$

$$L_{wR}=L_{wRo}/2^m;$$

wherein $L_{jR}$ is a compressed longitude value in the first compressed positioning information, $L_{wR}$ is a compressed latitude value in the first compressed positioning information, and in is calculated and acquired through the following formula: application precision unit=$2^m$* original unit of least precision.

Further, as another embodiment, the processing unit 402 is specifically configured to determine an upper bit value of the second compressed positioning information according to the simplifying parameter N and the first compressed positioning information, wherein the number of bits of the upper bit value is equal to a difference between the number of binary bits of the first compressed positioning information and the simplifying parameter N; and generates the upper bit value and the simplified positioning information into second compressed positioning information of the transmitting end.

Further, as another embodiment, the processing unit 402 is specifically configured to determine three upper bit values of the first compressed positioning information according to the simplifying parameter N and the first compressed positioning information, wherein the three upper bit values comprises an upper bit value of the first compressed positioning information and two upper bit values adjacent to the first compressed positioning information; and the generating the upper bit value of the first compressed positioning information and the simplified positioning information into the second compressed positioning information of the transmitting end comprises:

generating the three upper bit values and the simplified positioning information into three compressed positioning information respectively; and selecting the compressed positioning information in the three compressed positioning information having an absolute value difference with the first compressed positioning information being less than $2^N$ as the second compressed positioning information.

Further, as another embodiment, the processing unit 402 determines the three upper bit values of the first compressed positioning information according to the simplifying parameter N and the first compressed positioning information specifically as follows:

the processing unit 402 calculates a longitude value of a first upper bit value of the first compressed positioning information according to the following formula: $L_{jRH0}=L_{jR}$&(0xFFFFFF<<N), wherein $L_{jRH0}$ is the longitude value of the first upper bit value;

the processing unit 402 calculates a latitude value of the first upper bit value of the first compressed positioning information according to the following formula: $L_{wRH0}=L_{wR}$&(0xFFFFFF<<N), wherein $L_{wRH0}$ is the latitude value of the first upper bit value;

the processing unit 402 calculates a longitude value of a second upper bit value of the first compressed positioning information according to the following formula: $L_{jRH-1}=L_{jR}$&(0xFFFFFF<<N)−(1<<N), wherein $L_{jRH-1}$ is the longitude value of the second upper bit value;

the processing unit 402 calculates a latitude value of the second upper bit value of the first compressed positioning information according to the following formula: $L_{wRH-1}=L_{wR}$&(0xFFFFFF<<N)−(1<<N), wherein $L_{wRH-1}$ is the latitude value of the second upper bit value;

the processing unit 402 calculates a longitude value of a third upper bit value of the first compressed positioning information according to the following formula: $L_{jRH+1}=L_{jR}$&(0xFFFFFF<<N)+(1<<N), wherein $L_{jRH+1}$ is the longitude value of the third upper bit value; and the processing unit 402 calculates a latitude value of the third upper bit value of the first compressed positioning information according to the following formula: $L_{wRH+1}=L_{wR}$&(0xFFFFFF<<N)+(1<<N), wherein $L_{wRH+1}$ is the latitude value of the third upper bit value.

Further, as another embodiment, the processing unit 402 is specifically configured to transform the second compressed positioning information into second original integer positioning information according to the application precision unit and the original unit of least precision by the following formulas:

$$L_{jo}=L_j*2^m;$$

$$L_{wo}=L_w*2^m;$$

wherein $L_{jo}$ is an original integer longitude value of the second original integer positioning information, $L_{wo}$ is an original integer latitude value of the second original integer positioning information, $L_j$ is a compressed longitude value of the second compressed positioning information, and $L_w$ is a compressed latitude value of the second compressed positioning information.

Further, as another embodiment, the processing unit 402 is specifically configured to restore the second original integer positioning information into second original positioning information according to a following manner:

judging whether $L_{jo}$ is less than $108*10^6$, wherein an east longitude E'w of the second original positioning information is equal to 0 if $L_{jo}$ is less than $108*10^6$, and the east longitude E'w of the second original positioning information is equal to 1 if $L_{jo}$ is no less than $108*10^6$;

obtaining a longitude $E'_{DEG}$ of the second original positioning information, an integer part of minute values of the longitude $E'_{MINmm}$ of the second original positioning information, and a decimal part of the minute values of the longitude $E'_{MINF}$ of the second original positioning information by calculating the following formulas:

$$E'_{DEG}=L_{jo}\%(108*10^6)/(6*10^5);$$

$$E'_{MINmm}=L_{jo}\%(108*10^6)/(10^4);$$

$$E'_{MINF}=L_{jo}\%10^4;$$

judging whether $L_{wo}$ is less than $54*10^6$, wherein a northern latitude N's of the second original positioning information is equal to 0 if $L_{wo}$ is less than $54*10^6$, and the northern latitude N's of the second original positioning information is equal to 1 if $L_{wo}$ is no less than $54*10^6$; and obtaining a latitude $N'_{DEG}$ of the second original positioning information, an integer part of minute values of the latitude $N'_{MINmm}$ of the second original positioning information, and a decimal part of the minute values of the latitude $N'_{MINF}$ of the second original positioning information by calculating the following formulas:

$$N'_{DEG}=L_{wo}\%(54*10^6)/(6*10^5);$$

$$N'_{MINmm}=L_{wo}\%(54*10^6)/(10^4);$$

$$N'_{MINF}=L'_{wo}\%10^4.$$

The above is the introduction of the communication device from the perspective of functional modularity. The communication device in the embodiment of the present invention is described hereinafter from the perspective of hardware processing.

Figure 5:
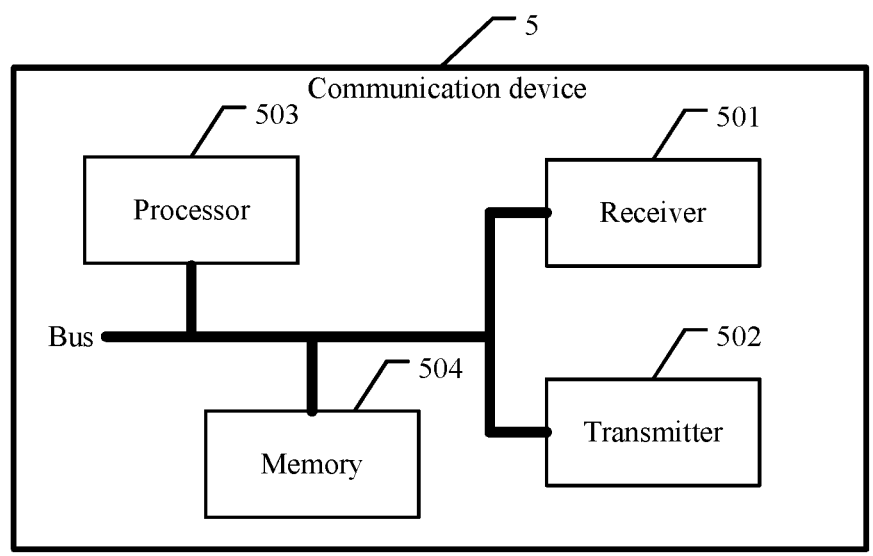
FIG. 5 is a schematic diagram of a hardware structure of a communications device according to an embodiment of the present invention.

FIG. 5 is another structural schematic diagram of a communication device 5 according to an embodiment of the present invention. The communication device 5 may comprise at least one network interface or other communication interfaces, at least one receiver 501, at least one transmitter 502, at least one processor 503, and a memory 504 to enable connection of communications between these devices through at least one network interface (which may be wired or wireless) to implement the communication connection between a system gateway and at least one other network element.

The memory 504 may comprise a read-only memory and a random access memory, and provide instructions and data to the processor 503. A portion of the memory 504 may also possibly comprise a high-speed random access memory (RAM, Random Access), and may also possibly comprise a non-volatile memory (non-volatile memory).

The memory 504 is stored with the following elements, executable modules or data structures, or subsets thereof, or their extensions:

operation instructions: comprising various operation instructions for implementing various operations; and an operating system: comprising various system programs for implementing various basic services and processing hardware-based tasks.

In the embodiment of the present invention, the processor 503 performs the following operations by invoking the operation instructions (the operation instructions may be stored in the operating system) stored in the memory 504:

transforming original positioning information into original integer positioning information, wherein the original integer positioning information is an integer value of the original positioning information; compressing the original integer positioning information into compressed positioning information according to an application precision unit and an original unit of least precision, wherein the number of binary bits corresponding to the compressed positioning information is less than the number of binary bits corresponding to the original integer positioning information; intercepting lower N bits as simplified positioning information from binary values corresponding to the compressed positioning information, wherein N is equal to $\log_2 R$, and R is a ratio of a maximum wireless communication distance between the transmitting end and the receiving end to the application precision unit; and then, transmitting the simplified positioning information to a receiving device through the transmitter 502.

In some embodiments, the above processor 503 can also execute the following steps:

transforming the original positioning information into the original integer positioning information by calculating the following formulas:

$$L_{jo}=Ew*108*10^6+E_{DEG}*6*10^5+E_{MINmm}*10^4+E_{MINF};$$

$$L_{wo}=Ns*54*10^6+N_{DEG}*6*10^5+N_{MINmm}*10^4+N_{MINF};$$

wherein $L_{jo}$ is an original integer longitude value in the original integer positioning information, Ew is an east-west longitude indicated value of the original positioning information, $E_{DEG}$ is a longitude of the original positioning information, $E_{MINmm}$ is an integer part of minute values of the longitude of the original positioning information, and $E_{MINF}$ is a decimal part of the minute values of the longitude of the original positioning information; and $L_{wo}$ is an original integer latitude value in the original integer positioning information, Ns is a south-northern latitude indicated value of the original positioning information, $N_{DEG}$ is a latitude of the original positioning information, $N_{MINmm}$ is an integer part of minute values of the latitude of the original positioning information, and $N_{MINF}$ is a decimal part of the minute values of the latitude of the original positioning information.

In some embodiments, the above processor 503 can also execute the following steps:

compressing the original integer positioning information into the compressed positioning information according to the application precision unit and the original unit of least precision by calculating the following formulas:

$$L_j=L_{jo}/2^m;$$

$$L_w=L_{wo}/2^m;$$

intercepting lower N bits as simplified positioning information from binary values corresponding to the compressed positioning information, wherein N is equal to $\log_2 R$, and R is a ratio of a maximum wireless communication distance between the transmitting end and the receiving end to the application precision unit; and wherein $L_j$ is a compressed longitude value in the compressed positioning information, $L_w$ is a compressed latitude value in the compressed positioning information, and in is calculated and acquired through the following formula: application precision unit=$2^m*$ original unit of least precision.

Figure 6:
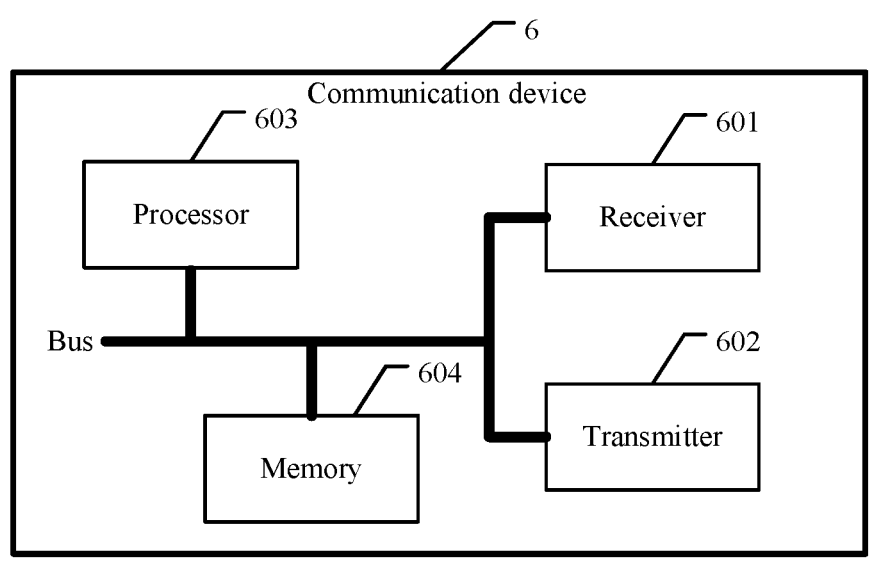
FIG. 6 is a schematic diagram of a hardware structure of a communications device according to an embodiment of the present invention.

FIG. 6 is another structural schematic diagram of a communication device 6 according to an embodiment of the present invention. The communication device 6 may comprise at least one network interface or other communication interfaces, at least one receiver 601, at least one transmitter 602, at least one processor 603, and a memory 604 to enable connection of communications between these devices through at least one network interface (which may be wired or wireless) to implement the communication connection between a system gateway and at least one other network element.

The memory 604 may comprise a read-only memory and a random access memory, and provide instructions and data to the processor 603. A portion of the memory 604 may also possibly comprise a high-speed random access memory (RAM, Random Access), and may also possibly comprise a non-volatile memory (non-volatile memory).

The memory 604 is stored with the following elements, executable modules or data structures, or subsets thereof, or their extensions:

operation instructions: comprising various operation instructions for implementing various operations; and an operating system: comprising various system programs for implementing various basic services and processing hardware-based tasks.

In the embodiment of the present invention, the processor 603 performs the following operations by invoking the operation instructions (the operation instructions may be stored in the operating system) stored in the memory 604:

receiving simplified positioning information transmitted by a transmitting end through the receiver 601; transforming the first original positioning information stored in the memory 604 into first original integer positioning information, wherein the first original integer positioning information is an integer value of the first original positioning information; compressing the first original integer positioning information into first compressed positioning information according to an application precision unit and an original unit of least precision, wherein the number of binary bits corresponding to the first compressed positioning information is less than the number of binary bits corresponding to the first original integer positioning information; afterwards, restoring the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit; restoring the second compressed positioning information into second original integer positioning information according to the application precision unit and the original unit of least precision; and restoring the second original integer positioning information into second original positioning information.

In some embodiments, the above processor 603 can also execute the following steps:

transforming the first original positioning information stored by the memory 604 into the first original integer positioning information by calculating the following formulas:

$$L_{jRo} = Ew*108*10^6 + E_{DEG}*6*10^5 + E_{MINmm}*10^4 + E_{MINF};$$

$$L_{wRo} = Ns*54*10^6 + N_{DEG}*6*10^5 + N_{MINmm}*10^4 + N_{MINF};$$

wherein $L_{jo}$ is an original integer longitude value in the first original integer positioning information, Ew is an east-west longitude indicated value of the first original positioning information, $E_{DEG}$ is a longitude of the first original positioning information, $E_{MINmm}$ is an integer part of minute values of the longitude of the first original positioning information, and $E_{MINF}$ is a decimal part of the minute values of the longitude of the first original positioning information; and $L_{wo}$ is an original integer latitude value in the first original integer positioning information, Ns is a south-northern latitude indicated value of the first original positioning information, $N_{DEG}$ is a latitude of the first original positioning information, $N_{MINmm}$ is an integer part of minute values of the latitude of the first original positioning information, and $N_{MINF}$ is a decimal part of the minute values of the latitude of the first original positioning information.

In some embodiments, the above processor 603 can also execute the following steps:

compressing the first original integer positioning information into the first compressed positioning information according to the application precision unit and the original unit of least precision by calculating the following formulas:

$$L_{jR} = L_{jRo}/2^m;$$

$$L_{wR} = L_{wRo}/2^m;$$

wherein $L_{jR}$ is a compressed longitude value in the first compressed positioning information, $L_{wR}$ is a compressed latitude value in the first compressed positioning information, and m is calculated and acquired through the following formula: application precision unit=$2^m$* original unit of least precision.

In some embodiments, the above processor 603 can also execute the following steps:

determining an upper bit value of the second compressed positioning information according to the simplifying parameter N and the first compressed positioning information, wherein the number of bits of the upper bit value is equal to a difference between the number of binary bits of the first compressed positioning information and the simplifying parameter N; and generating the upper bit value and the simplified positioning information into the second compressed positioning information of the transmitting end.

In some embodiments, the above processor 603 can also execute the following steps:

determining three upper bit values of the first compressed positioning information according to the simplifying parameter N and the first compressed positioning information, wherein the three upper bit values comprise an upper bit value of the first compressed positioning information and two upper bit values adjacent to the first compressed positioning information; and the generating the upper bit value of the first compressed positioning information and the simplified positioning information into the second compressed positioning information of the transmitting end comprises:

generating the three upper bit values and the simplified positioning information into three compressed positioning information respectively; and selecting the compressed positioning information in the three compressed positioning information having an absolute value difference with the first compressed positioning information being less than $2^N$ as the second compressed positioning information.

In some embodiments, the above processor 603 can also execute the following steps:

the determining the three upper bit values of the first compressed positioning information according to the simplifying parameter N and the first compressed positioning information specifically comprises:

calculating a longitude value of a first upper bit value of the first compressed positioning information according to the following formula: $L_{jRH0} = L_{jR} \& (0\text{xFFFFFF} \ll N)$, wherein $L_{jRH0}$ is the longitude value of the first upper bit value;

calculating a latitude value of the first upper bit value of the first compressed positioning information according to the following formula: $L_{wRH0} = L_{wR} \& (0\text{xFFFFFF} \ll N)$, wherein $L_{wRH0}$ is the latitude value of the first upper bit value;

calculating a longitude value of a second upper bit value of the first compressed positioning information according to the following formula: $L_{jRH-1}=L_{jR}$&(0xFFFFFF<<N)−(1<<N), wherein $L_{jRH-1}$ is the longitude value of the second upper bit value;

calculating a latitude value of the second upper bit value of the first compressed positioning information according to the following formula: $L_{wRH-1}=L_{wR}$&(0xFFFFFF<<N)−(1<<N), wherein $L_{wRH-1}$ is the latitude value of the second upper bit value;

calculating a longitude value of a third upper bit value of the first compressed positioning information according to the following formula: $L_{jRH+1}=L_{jR}$&(0xFFFFFF<<N)+(1<<N), wherein $L_{jRH+1}$ is the longitude value of the third upper bit value; and calculating a latitude value of the third upper bit value of the first compressed positioning information according to the following formula: $L_{wRH+1}=L_{wR}$&(0xFFFFFF<<N)+(1<<N), wherein $L_{wRH+1}$ is the latitude value of the third upper bit value.

In some embodiments, the above processor 603 can also execute the following steps:

transforming the second compressed positioning information into second original integer positioning information according to the application precision unit and the original unit of least precision by the following formulas:

$$L_{jo}=L_j*2^m;$$

$$L_{wo}=L_w*2^m;$$

wherein $L_{jo}$ is an original integer longitude value of the second original integer positioning information, $L_{wo}$ is an original integer latitude value of the second original integer positioning information, $L_j$ is a compressed longitude value of the second compressed positioning information, and $L_w$ is a compressed latitude value of the second compressed positioning information.

In some embodiments, the above processor 603 can also execute the following steps:

restoring the second original integer positioning information into second original positioning information according to a following manner:

judging whether $L_{jo}$ is less than $108*10^6$, wherein an east longitude E'w of the second original positioning information is equal to 0 if $L_{jo}$ is less than $108*10^6$, and the east longitude E'w of the second original positioning information is equal to 1 if $L_{jo}$ is no less than $108*10^6$;

obtaining a longitude $E'_{DEG}$ of the second original positioning information, an integer part of minute values of the longitude $E'_{MINmm}$ of the second original positioning information, and a decimal part of the minute values of the longitude $E'_{MINF}$ of the second original positioning information by calculating the following formulas:

$$E'_{DEG}=L_{jo}\%(108*10^6)/(6*10^5);$$

$$E'_{MINmm}=L_{jo}\%(108*10^6)/(10^4);$$

$$E'_{MINF}=L_{jo}\%10^4;$$

judging whether $L_{wo}$ is less than $54*10^6$, wherein a northern latitude N's of the second original positioning information is equal to 0 if $L_{wo}$ is less than $54*10^6$, and the northern latitude N's of the second original positioning information is equal to 1 if $L_{wo}$ is no less than $54*10^6$; and obtaining a latitude $N'_{DEG}$ of the second original positioning information, an integer part of minute values of the latitude $N'_{MINmm}$ of the second original positioning information, and a decimal part of the minute values of the latitude $N'_{MINF}$ of the second original positioning information by calculating the following formulas:

$$N'_{DEG}=L_{wo}\%(54*10^6)/(6*10^5);$$

$$N'_{MINmm}=L_{wo}\%(54*10^6)/(10^4);$$

$$N'_{MINF}=L'_{wo}\%10^4.$$

In the foregoing embodiments, the description of each embodiment has its own emphasis. For the parts that are not described in detail in one embodiment, reference may be made to related descriptions in other embodiments.

Those skilled in the art may clearly understand that, for convenience and simplicity of description, reference may be made to corresponding processes in the foregoing method embodiments for specific working processes of the foregoing system, apparatus and unit, and details will not be elaborated herein.

In the several embodiments provided in the present application, it should be understood that the disclosed system, apparatus and method may be implemented in other manners. For example, the device embodiments described above are only exemplary. For instance, the division of the units herein is merely a logical division, and another division manner may be provided during actual implementation, for example, multiple units or components can be combined or integrated into another system, or some of the features can be ignored, or not executed. In addition, the shown or discussed mutual coupling or direct coupling or communication connection may be indirect coupling or communication connection through some interfaces, and the indirect coupling or communication connection of the apparatuses or units may be electrical, mechanical or other forms.

The units described as separate parts may or may not be physically separated. The parts displayed as units may or may not be physical units, i.e., may be located in one place or may also be distributed to multiple network units. Some or all of the units may be selected according to actual needs to achieve the objects of the solutions in the embodiments.

In addition, each functional unit in each embodiment of the invention may be integrated into one processing unit, or each unit may exist alone physically, or two or more units may be integrated in one unit. The integrated unit above may be implemented in the form of hardware, or in the form of software functional unit.

The integrated unit may be stored in a computer-readable storage medium if being implemented in the form of a software functional unit and sold or used as an independent product. Based on such understanding, the essence of the technical solutions of the invention, or the part contributing to the prior art, or all or a part of the technical solutions, may be embodied in the form of a software product which is stored in a storage medium including a number of instructions such that a computer device (which may be a personal computer, a server, or a network device, etc.) performs all or a part of steps of the method described in each of the embodiments of the invention. The storage medium mentioned previously comprises any medium that is capable of storing program codes such as a USB disk, a mobile hard disk, a read-only memory (ROM, Read-Only Memory), a magnetic disk or an optical disk, and the like.

The positioning information transmission method and the communication device provided by the invention are described in detail above. Specific examples are used herein to describe the principle and implementation manners of the invention. The description of the foregoing embodiments is merely intended to help understanding of the method of the invention and the core idea therefore. In the meanwhile, those skilled in the art may make modifications to the specific implementation manners and the application scope according to the idea of the invention. In conclusion, the contents of the description should not be construed as limiting the invention.

The invention claimed is:

1. A positioning information transmission method, comprising:
    transforming, by a transmitting end, original positioning information into original integer positioning information, wherein the original integer positioning information is an integer value of the original positioning information;
    compressing, by the transmitting end, the original integer positioning information into compressed positioning information according to an application precision unit and an original unit of least precision, wherein a number of binary bits corresponding to the compressed positioning information is less than a number of binary bits corresponding to the original integer positioning information;
    intercepting, by the transmitting end, lower N bits as simplified positioning information from the number of binary bits corresponding to the compressed positioning information, wherein N is equal to $\log_2 R$, and R is a ratio of a maximum wireless communication distance between the transmitting end and the receiving end to the application precision unit; and
    transmitting, by the transmitting end, the simplified positioning information to the receiving end.

2. The method according to claim 1, wherein the transmitting end transforms the original positioning information into the original integer positioning information by calculating the following formulas:

$$L_{jo} = Ew*108*10^6 + E_{DEG}*6*10^5 + E_{MINmm}*10^4 + E_{MINF};$$

$$L_{wo} = Ns*54*10^6 + N_{DEG}*6*10^5 + N_{MINmm}*10^4 + N_{MINF};$$

wherein $L_{jo}$ is an original integer longitude value in the original integer positioning information, Ew is an east-west longitude indicated value of the original positioning information, $E_{DEG}$ is a longitude of the original positioning information, $E_{MINmm}$ is an integer part of minute values of the longitude of the original positioning information, and $E_{MINF}$ is a decimal part of the minute values of the longitude of the original positioning information; and $L_{wo}$ is an original integer latitude value in the original integer positioning information, Ns is a south-northern latitude indicated value of the original positioning information, $N_{DEG}$ is a latitude of the original positioning information, $N_{MINmm}$ is an integer part of minute values of the latitude of the original positioning information, and $N_{MINF}$ is a decimal part of the minute values of the latitude of the original positioning information.

3. The method according to claim 1, wherein the transmitting end compresses the original integer positioning information into the compressed positioning information according to the application precision unit and the original unit of least precision by calculating the following formulas:

$$L_j = L_{jo}/2^m;$$

$$L_w = L_{wo}/2^m;$$

wherein $L_j$ is a compressed longitude value in the compressed positioning information, $L_w$ is a compressed latitude value in the compressed positioning information, $L_{jo}$ is an original integer longitude value in the original integer positioning information, $L_{wo}$ is an original integer latitude value in the original integer positioning information, and m is calculated and acquired through the following formula: application precision unit=$2^m$* original unit of least precision.

4. The method according to claim 1, the method further comprising:
    receiving, by a receiving end, simplified positioning information transmitted by the transmitting end;
    transforming, by the receiving end, first original positioning information thereof into first original integer positioning information, wherein the first original integer positioning information is an integer value of the first original positioning information;
    compressing, by the receiving end, the first original integer positioning information into first compressed positioning information according to an application precision unit and an original unit of least precision, wherein a number of binary bits corresponding to the first compressed positioning information is less than a number of binary bits corresponding to the first original integer positioning information;
    restoring, by the receiving end, the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit;
    restoring, by the receiving end, the second compressed positioning information into second original integer positioning information according to the application precision unit and the original unit of least precision; and
    restoring, by the receiving end, the second original integer positioning information into second original positioning information.

5. The method according to claim 4, wherein the receiving end transforms the first original positioning information thereof into the first original integer positioning information by calculating the following formulas:

$$L_{jRo} = Ew*108*10^6 + E_{DEG}*6*10^5 + E_{MINmm}*10^4 + E_{MINF};$$

$$L_{wRo} = N_S*54*10^6 + N_{DEG}*6*10^5 + N_{MINmm}*10^4 + N_{MINF};$$

wherein $L_{jRo}$ is an original integer longitude value in the first original integer positioning information, $E_w$ is an east-west longitude indicated value of the first original positioning information, $E_{DEG}$ is a longitude of the first original positioning information, $E_{MINmm}$ is an integer part of minute values of the longitude of the first original positioning information, and $E_{MINF}$ is a decimal part of the minute values of the longitude of the first original positioning information; and $L_{wRo}$ is an original integer latitude value in the first original integer positioning information, Ns is a south-northern latitude indicated value of the first original positioning information, $N_{DEG}$ is a latitude of the first original positioning information, $N_{MINmm}$ is an integer part of minute values of the latitude of the first original positioning information, and $N_{MINF}$ is a decimal part of the minute values of the latitude of the first original positioning information.

6. The method according to claim 5, wherein the receiving end compresses the first original integer positioning information into the first compressed positioning information according to the application precision unit and the original unit of least precision by calculating the following formulas:

$$L_{jR}=L_{jRo}/2^m;$$

$$L_{wR}=L_{wRo}/2^m;$$

wherein $L_{jR}$ is a compressed longitude value in the first compressed positioning information, $L_{wR}$ is a compressed latitude value in the first compressed positioning information, and m is calculated and acquired through the following formula: application precision unit=$2^m$* original unit of least precision.

7. The method according to claim 6, wherein the restoring, by the receiving end, the simplified positioning information into second compressed positioning information of the transmitting end according to a simplifying parameter N and the first compressed positioning information comprises:
  determining, by the receiving end, an upper bit value of the second compressed positioning information according to the simplifying parameter N and the first compressed positioning information, wherein the number of bits of the upper bit value is equal to a difference between the number of binary bits of the first compressed positioning information and the simplifying parameter N; and
  generating, by the receiving end, the upper bit value and the simplified positioning information into the second compressed positioning information of the transmitting end.

8. The method according to claim 7, wherein the determining, by the receiving end, an upper bit value of the second compressed positioning information according to the simplifying parameter N and the first compressed positioning information comprises:
  determining, by the receiving end, three upper bit values of the first compressed positioning information according to the simplifying parameter N and the first compressed positioning information, wherein the three upper bit values comprise an upper bit value of the first compressed positioning information and two upper bit values adjacent to the first compressed positioning information; and
  the generating, by the receiving end, the upper bit value of the first compressed positioning information and the simplified positioning information into the second compressed positioning information of the transmitting end comprises:
  generating, by the receiving end, the three upper bit values and the simplified positioning information into three compressed positioning information respectively; and
  selecting, by the receiving end, the compressed positioning information in the three compressed positioning information having an absolute value difference with the first compressed positioning information being less than $2^N$ as the second compressed positioning information.

9. The method according to claim 8, wherein the determining, by the receiving end, three upper bit values of the first compressed positioning information according to the simplifying parameter N and the first compressed positioning information comprises:
  calculating, by the receiving end, a first upper bit value of the first compressed positioning information according to the following formula: $L_{jRH0}=L_{jR}$&(0xFFFFFF<<N), wherein $L_{jRH0}$ is the longitude value of the first upper bit value;
  calculating, by the receiving end, a latitude value of the first upper bit value of the first compressed positioning information according to the following formula: $L_{wRH0}=L_{wR}$&(0xFFFFFF<<N), wherein $L_{wRH0}$ is the latitude value of the first upper bit value;
  calculating, by the receiving end, a longitude value of a second upper bit value of the first compressed positioning information according to the following formula: $L_{jRH-1}=L_{jR}$&(0xFFFFFF<<N)−(1<<N), wherein $L_{jRH-1}$ is the longitude value of the second upper bit value;
  calculating, by the receiving end, a latitude value of the second upper bit value of the first compressed positioning information according to the following formula: $L_{wRH-1}=L_{wR}$&(0xFFFFFF<<N)−(1<<N), wherein $L_{wRH-1}$ is the latitude value of the second upper bit value;
  calculating, by the receiving end, a longitude value of a third upper bit value of the first compressed positioning information according to the following formula: $L_{jRH+1}=L_{wR}$&(0xFFFFFF<<N)+(1<<N), wherein $L_{wRH+1}$ is the longitude value of the third upper bit value; and
  calculating, by the receiving end, a latitude value of the third upper bit value of the first compressed positioning information according to the following formula: $L_{wRH+1}=L_{wR}$&(0xFFFFFF<<N)+(1<<N), wherein $L_{wRH+1}$ is the latitude value of the third upper bit value.

10. The method according to any one of claim 9, wherein the receiving end transforms the second compressed positioning information into second original integer positioning information according to the application precision unit and the original unit of least precision by the following formulas:

$$L_{jo}=L_j/2^m;$$

$$L_{wo}=L_w/2^m;$$

wherein $L_{jo}$ is an original integer longitude value of the second original integer positioning information, $L_{wo}$ is an original integer latitude value of the second original integer positioning information, $L_j$ is a compressed longitude value of the second compressed positioning information, and $L_w$ is a compressed latitude value of the second compressed positioning information.

11. The method according to claim 8, wherein the restoring, by the receiving end, the second original integer positioning information into second original positioning information comprises:
  judging, by the receiving end, whether $L_{jo}$ is less than 108*$10^6$, wherein an east longitude E'w of the second original positioning information is equal to 0 if $L_{jo}$ is less than 108*$10^6$, and the east longitude E'w of the second original positioning information is equal to 1 if $L_{jo}$ is no less than 108*$10^6$;
  obtaining, by the receiving end, a longitude E'$_{DEG}$ of the second original positioning information, an integer part of minute values of the longitude E'$_{MINmm}$ of the second original positioning information, and a decimal part of the minute values of the longitude E'MINF of the second original positioning information by calculating the following formulas:

$$E'_{DEG}=L_{jo}\%(108*10^6)/(6*10^5);$$

$$E'_{MINmm}=L_{jo}\%(108*10^6)/(10^4);$$

$$E'_{MINF}=L_{jo}\%\ 10^4;$$

judging, by the receiving end, whether $L_{wo}$ is less than $54*10^6$, wherein a northern latitude N's of the second original positioning information is equal to 0 if $L_{wo}$ is less than $54*106$, and the northern latitude N's of the second original positioning information is equal to 1 if $L_{wo}$ is no less than $54*106$; and obtaining, by the receiving end, a latitude $N'_{DEG}$ of the second original positioning information, an integer part of minute values of the latitude $N'_{MINmm}$ of the second original positioning information, and a decimal part of the minute values of the latitude $N'_{MINF}$ of the second original positioning information by calculating the following formulas:

$$N'_{DEG}=L_{wo} \% (54*10^6)/(6*10^5);$$

$$N'_{MINmm}=L_{wo} \% (54*10^6)/(10^4);$$

$$N'_{MINF}=L'_{wo} \% 10^4.$$

12. A communication device, comprising:
a first processing unit, configured to transform original positioning information into original integer positioning information, wherein the original integer positioning information is an integer value of the original positioning information; compress the original integer positioning information into compressed positioning information according to an application precision unit and an original unit of least precision, wherein a number of binary bits corresponding to the compressed positioning information is less than a number of binary bits corresponding to the original integer positioning information; and then intercept lower N bits as simplified positioning information from the number of binary bits corresponding to the compressed positioning information, wherein N is equal to $\log_2 R$, and R is a ratio of a maximum wireless communication distance between the transmitting end and the receiving end to the application precision unit; and
a transmitting unit, configured to transmit the simplified positioning information to the receiving end.

13. The communication device according to claim 12, wherein:
the first processing unit is specifically configured to transform the original positioning information into the original integer positioning information by calculating the following formulas:

$$L_{jo}=Ew*108*10^6+E_{DEG}*6*10^5+E_{MINmm}*10^4+E_{MINF};$$

$$L_{wo}=Ns*54*10^6+N_{DEG}*6*10^5+N_{MINmm}*10^4+N_{MINF};$$

wherein $L_{jo}$ is an original integer longitude value in the original integer positioning information, Ew is an east-west longitude indicated value of the original positioning information, $E_{DEG}$ is a longitude of the original positioning information, $E_{MINmm}$ is an integer part of minute values of the longitude of the original positioning information, and $E_{MINF}$ is a decimal part of the minute values of the longitude of the original positioning information; and $L_{wo}$ is an original integer latitude value in the original integer positioning information, Ns is a south-northern latitude indicated value of the original positioning information, $N_{DEG}$ is a latitude of the original positioning information, $N_{MINmm}$ is an integer part of minute values of the latitude of the original positioning information, and $N_{MINF}$ is a decimal part of the minute values of the latitude of the original positioning information.

14. The communication device according to claim 12, wherein:
the first processing unit is specifically configured to compress the original integer positioning information into the compressed positioning information according to the application precision unit and the original unit of least precision by calculating the following formulas:

$$L_j=L_{jo}/2^m;$$

$$L_w=L_{wo}/2^m;$$

and then intercept lower N bits as simplified positioning information from binary values corresponding to the compressed positioning information, wherein N is equal to $\log_2 R$, and R is a ratio of a maximum wireless communication distance between the transmitting end and the receiving end to the application precision unit; and wherein $L_j$ is a compressed longitude value in the compressed positioning information, $L_w$ is a compressed latitude value in the compressed positioning information, $L_{jo}$ is an original integer longitude value in the original integer positioning information, $L_{wo}$ is an original integer latitude value in the original integer positioning information, and m is calculated and acquired through the following formula: application precision unit=$2^m*$ original unit of least precision.

15. The communication device according to claim 12, further comprising:
a receiving unit, configured to receive simplified positioning information transmitted by the transmitting end;
a second processing unit, configured to transform first original positioning information thereof into first original integer positioning information, wherein the first original integer positioning information is an integer value of the first original positioning information; compress the first original integer positioning information into first compressed positioning information according to an application precision unit and an original unit of least precision, wherein a number of binary bits corresponding to the first compressed positioning information is less than a number of binary bits corresponding to the first original integer positioning information; afterwards, restore the simplified positioning information into second compressed positioning information of the transmitting end according to a simplifying parameter N and the first compressed positioning information, wherein N is equal to $\log_2 R$, and R is a ratio of a maximum wireless communication distance between the transmitting end and the receiving end to the application precision unit; restore the second compressed positioning information into second original integer positioning information according to the application precision unit and the original unit of least precision; and restore the second original integer positioning information into second original positioning information.

16. The communication device according to claim 15, wherein:
the second processing unit is specifically configured to transform the first original positioning information thereof into the first original integer positioning information by calculating the following formulas:

$$L_{jRo}=Ew*108*10^6+E_{DEG}*6*10^5+E_{MINmm}*10^4+E_{MINF};$$

$$L_{wRo}=Ns*54*10^6+N_{DEG}*6*10^5+N_{MINmm}*10^4+N_{MINF};$$

wherein $L_{jo}$ is an original integer longitude value in the first original integer positioning information, Ew is an east-west longitude indicated value of the first original positioning information, $E_{DEG}$ is a longitude of the first original positioning information, $E_{MINmm}$ is an integer part of minute values of the longitude of the first original positioning information, and $E_{MINF}$ is a decimal part of the minute values of the longitude of the first original positioning information; and $L_{wo}$ is an original integer latitude value in the first original integer positioning information, Ns is a south-northern latitude indicated value of the first original positioning information, $N_{DEG}$ is a latitude of the first original positioning information, $N_{MINmm}$ is an integer part of minute values of the latitude of the first original positioning information, and $N_{MINF}$ is a decimal part of the minute values of the latitude of the first original positioning information.

17. The communication device according to claim 16, wherein:
the second processing unit is specifically configured to compress the first original integer positioning information into the first compressed positioning information according to the application precision unit and the original unit of least precision by calculating the following formulas:

$$L_{jR}=L_{jRo}/2^m;$$

$$L_{wR}=L_{wRo}/2^m;$$

wherein $L_{jR}$ is a compressed longitude value in the first compressed positioning information, $L_{wR}$ is a compressed latitude value in the first compressed positioning information, and m is calculated and acquired through the following formula: application precision unit=$2^m$* original unit of least precision.

18. The communication device according to claim 17, wherein:
the second processing unit is specifically configured to determine an upper bit value of the second compressed positioning information according to the simplifying parameter N and the first compressed positioning information, wherein the number of bits of the upper bit value is equal to a difference between the number of binary bits of the first compressed positioning information and the simplifying parameter N; and generate the upper bit value and the simplified positioning information into the second compressed positioning information of the transmitting end.

19. The communication device according to claim 18, wherein:
the second processing unit is specifically configured to determine three upper bit values of the first compressed positioning information according to the simplifying parameter N and the first compressed positioning information, wherein the three upper bit values comprise an upper bit value of the first compressed positioning information and two upper bit values adjacent to the first compressed positioning information; and
the generating the upper bit value of the first compressed positioning information and the simplified positioning information into the second compressed positioning information of the transmitting end comprises:
generating the three upper bit values and the simplified positioning information into three compressed positioning information respectively; and
selecting the compressed positioning information in the three compressed positioning information having an absolute value difference with the first compressed positioning information being less than 2N as the second compressed positioning information.

20. A communication device, comprising:
a processor, a memory, a receiver and a transmitter which are mutually connected;
wherein the memory is configured to store an application, and the processor, by executing the application, is configured to:
transform original positioning information into original integer positioning information, wherein the original integer positioning information is an integer value of the original positioning information; compress the original integer positioning information into compressed positioning information according to an application precision unit and an original unit of least precision, wherein a number of binary bits corresponding to the compressed positioning information is less than a number of binary bits corresponding to the original integer positioning information; intercept lower N bits as simplified positioning information from the number of binary bits corresponding to the compressed positioning information, wherein N is equal to $\log_2 R$, and R is a ratio of a maximum wireless communication distance between the transmitting end and the receiving end to the application precision unit; and transmit the simplified positioning information to the receiving end through the transmitter.

\* \* \* \* \*